(12) United States Patent
Asai

(10) Patent No.: US 10,230,863 B2
(45) Date of Patent: *Mar. 12, 2019

(54) INFORMATION PROCESSING DEVICE PERFORMING A DATA SHARING PROCESS AMONG APPLICATIONS AND CONTROLLING METHOD THEREOF

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,356

(22) Filed: Jan. 9, 2017

(65) Prior Publication Data
US 2017/0118367 A1  Apr. 27, 2017

Related U.S. Application Data

(63) Continuation of application No. 14/338,723, filed on Jul. 23, 2014, now Pat. No. 9,549,090.

(30) Foreign Application Priority Data

Jul. 23, 2013 (JP) ................................ 2013-152939

(51) Int. Cl.
*H04N 1/00* (2006.01)

(52) U.S. Cl.
CPC ..... *H04N 1/00941* (2013.01); *H04N 1/00225* (2013.01); *H04N 1/00307* (2013.01);
(Continued)

(58) Field of Classification Search
CPC ........... H04N 1/00461; H04N 1/00474; H04N 1/00938; H04N 1/00941; G06F 3/1248
See application file for complete search history.

(56) References Cited

U.S. PATENT DOCUMENTS 6,049,390 A   4/2000 Notredame et al.
6,259,456 B1  7/2001 Gibson et al.
(Continued)

FOREIGN PATENT DOCUMENTS

JP   04-190421 A   7/1992
JP   05-257669 A   10/1993
(Continued)

OTHER PUBLICATIONS

Notice of Reasons for Refusal issued in corresponding Japanese Patent Application No. 2013-152939 dated Feb. 8, 2017.
(Continued)

*Primary Examiner* — Nicholas Pachol
(74) *Attorney, Agent, or Firm* — Merchant & Gould P.C.

(57) ABSTRACT

An information processing device comprising: a data sharing unit causing an application to process data output from a data output source application; a communication interface configured to perform communication with an external device; and a processor that, when executing the instructions, performs operations comprising: acquiring an image data set from the external device through the communication interface; defining plural image data groups, each of the plural image data groups including at least one of the plurality of image data included in the image data set; selecting a plurality of the applications each of which is corresponding to each of the plural image data groups, respectively; and causing the data sharing unit to perform a sharing process of making each of the plurality of the selected applications process the at least one of the plurality of image data included in each of the plural image data groups, respectively.

11 Claims, 15 Drawing Sheets

(52) U.S. Cl.
CPC ..... *H04N 1/00411* (2013.01); *H04N 1/00413* (2013.01); *H04N 1/00453* (2013.01); *H04N 1/00461* (2013.01); *H04N 1/00474* (2013.01); *H04N 1/00509* (2013.01); *H04N 2201/0039* (2013.01); *H04N 2201/0094* (2013.01)

(56) References Cited

U.S. PATENT DOCUMENTS

| | | | |
|---|---|---|---|
| 6,707,463 B1 | 3/2004 | Gibson et al. | |
| 6,775,678 B1 | 8/2004 | Hillberg | |
| 7,543,246 B2 | 6/2009 | Mifune | |
| 7,911,643 B2 | 3/2011 | Yamada et al. | |
| 8,319,989 B2 | 11/2012 | Mizunashi et al. | |
| 8,957,901 B2 | 2/2015 | Asai | |
| 9,294,647 B2 | 3/2016 | Yamada | |
| 2001/0025326 A1* | 9/2001 | Kizaki | H04N 1/00127 710/100 |
| 2001/0040589 A1 | 11/2001 | DeBliek et al. | |
| 2003/0099379 A1 | 5/2003 | Monk et al. | |
| 2003/0154207 A1 | 8/2003 | Naito | |
| 2003/0184803 A1 | 10/2003 | Yamada et al. | |
| 2005/0063004 A1 | 3/2005 | Silverbrook et al. | |
| 2005/0114766 A1 | 5/2005 | Yamamoto | |
| 2005/0229010 A1 | 10/2005 | Monk et al. | |
| 2006/0028675 A1 | 2/2006 | Watanabe et al. | |
| 2006/0055766 A1 | 3/2006 | Kawata et al. | |
| 2006/0066621 A1 | 3/2006 | Herceg et al. | |
| 2007/0206088 A1 | 9/2007 | Mizunashi et al. | |
| 2008/0068640 A1 | 3/2008 | Todaka | |
| 2008/0212129 A1 | 9/2008 | Yoshiida | |
| 2008/0282065 A1 | 11/2008 | Imamichi | |
| 2009/0034782 A1 | 2/2009 | Gering | |
| 2009/0051947 A1 | 2/2009 | Kuroshima | |
| 2009/0102483 A1 | 4/2009 | Shimmoto | |
| 2009/0109458 A1 | 4/2009 | Nagata | |
| 2009/0109483 A1 | 4/2009 | Shimmoto | |
| 2009/0109486 A1 | 4/2009 | Shimmoto | |
| 2009/0161970 A1 | 6/2009 | Harada | |
| 2009/0244592 A1 | 10/2009 | Grams | |
| 2009/0284611 A1* | 11/2009 | Wood | H04N 1/32 348/211.1 |
| 2009/0324013 A1 | 12/2009 | Tanaka | |
| 2010/0027062 A1 | 2/2010 | Takashima | |
| 2010/0053696 A1 | 3/2010 | Sasano et al. | |
| 2010/0118338 A1 | 5/2010 | Sakiyama et al. | |
| 2010/0118344 A1 | 5/2010 | Asano | |
| 2010/0146442 A1 | 6/2010 | Nagasaka et al. | |
| 2011/0004830 A1 | 1/2011 | Von Kaenel et al. | |
| 2011/0047450 A1 | 2/2011 | Park et al. | |
| 2011/0099093 A1 | 4/2011 | Mills | |
| 2011/0161076 A1 | 6/2011 | Davis et al. | |
| 2011/0225490 A1 | 9/2011 | Meunier | |
| 2011/0296439 A1 | 12/2011 | Kozaki | |
| 2012/0063700 A1 | 3/2012 | Ignatchenko et al. | |
| 2012/0243043 A1 | 9/2012 | Asai | |
| 2012/0243048 A1 | 9/2012 | Asai | |
| 2012/0293832 A1 | 11/2012 | Fujita | |
| 2012/0307275 A1 | 12/2012 | Tamashima | |
| 2013/0063619 A1 | 3/2013 | Asai | |
| 2013/0076705 A1 | 3/2013 | Murata | |
| 2013/0094056 A1 | 4/2013 | Kobayashi | |
| 2013/0195421 A1 | 8/2013 | Chen et al. | |
| 2014/0002857 A1 | 1/2014 | Huang et al. | |
| 2014/0365919 A1 | 12/2014 | Shaw et al. | |
| 2015/0029530 A1 | 1/2015 | Asai | |
| 2015/0128067 A1 | 5/2015 | Wong et al. | |

FOREIGN PATENT DOCUMENTS

| | | |
|---|---|---|
| JP | 11-065795 A | 3/1999 |
| JP | 11-316693 A | 11/1999 |
| JP | 2001-256186 A | 9/2001 |
| JP | 2003-241879 A | 8/2003 |
| JP | 2004-007517 A | 1/2004 |
| JP | 2005-049928 A | 2/2005 |
| JP | 2005-190414 A | 7/2005 |
| JP | 2006-086727 A | 3/2006 |
| JP | 2007-251522 A | 9/2007 |
| JP | 2008-236421 A | 10/2008 |
| JP | 2008-283441 A | 11/2008 |
| JP | 2009-111904 A | 5/2009 |
| JP | 2010-157207 A | 7/2010 |
| JP | 2011-029746 A | 2/2011 |
| JP | 2012-203740 A | 10/2012 |
| JP | 2012-203742 A | 10/2012 |
| JP | 2012-248051 A | 12/2012 |
| JP | 2013-058114 A | 3/2013 |
| JP | 2013-077126 A | 4/2013 |
| WO | 2008041318 A1 | 4/2008 |

OTHER PUBLICATIONS

Japanese Office Action issued in related application 2011-069000, dated Feb. 26, 2011.

U.S. Office Action issued in related U.S. Appl. No. 14/572,962, dated Aug. 28, 2015.

U.S. non-final Office Action issued in related U.S. Appl. No. 14/623,187, dated May 20, 2016.

U.S. Office Action (Notice of Allowance) issued in related U.S. Appl. No. 14/572,962, dated Dec. 23, 2015.

U.S. Office Action (Notice of Allowance) issued in related U.S. Appl. No. 14/623,187, dated Nov. 9, 2016.

Application as filed in related U.S. Appl. No. 14/623,187, filed Feb. 16, 2015.

Application as filed in related U.S. Appl. No. 14/572,962, filed Dec. 17, 2014.

Office Action (Notification of Reasons for Refusal) issued in related Japanese Patent Application No. 2017-143713, dated Sep. 25, 2018.

Office Action issued in related U.S. Appl. No. 15/828,538, dated Nov. 13, 2018.

Office Action (Notification of Reasons for Refusal) issued in related Japanese Patent Application No. 2017-220707, dated Aug. 14, 2018.

\* cited by examiner

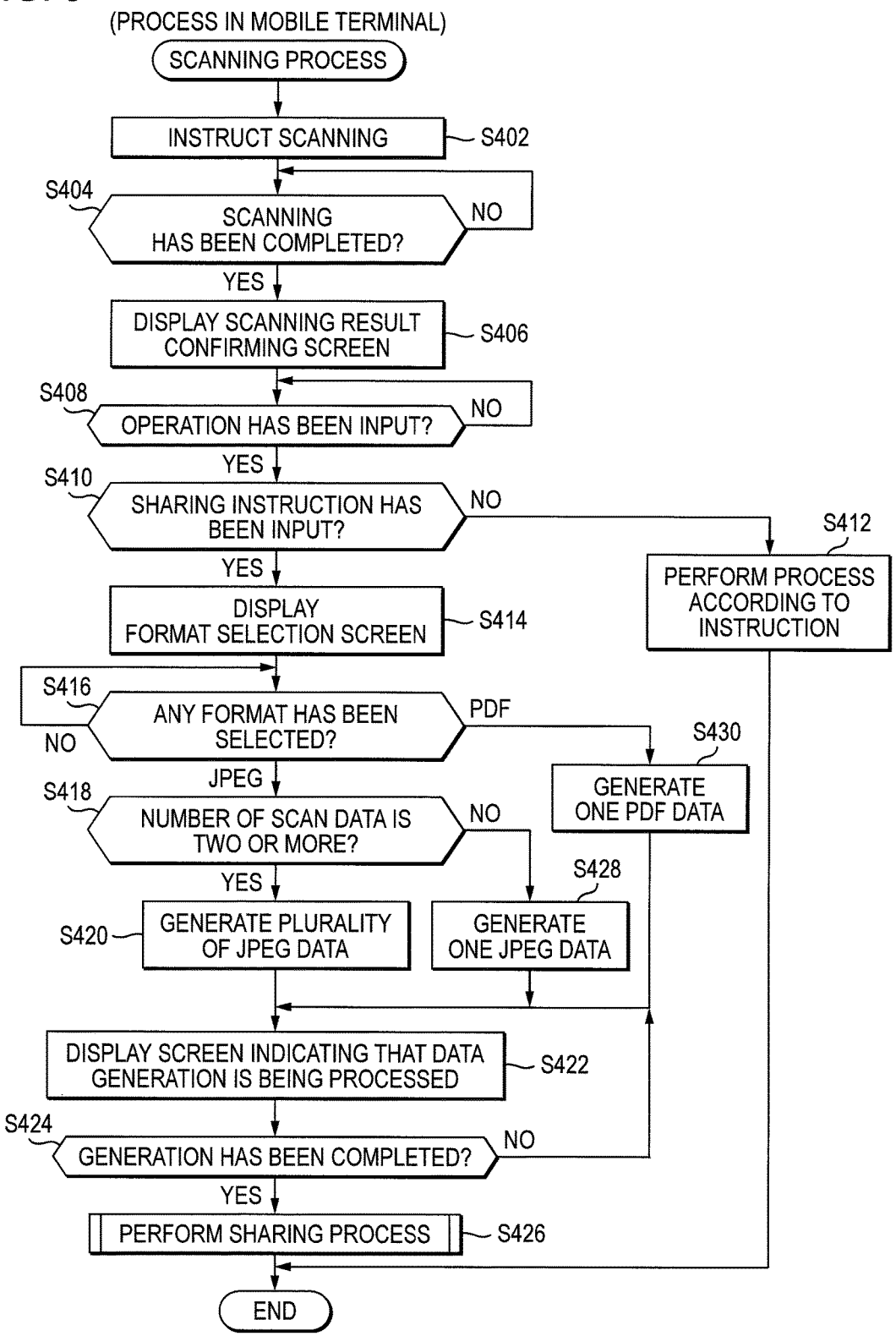

INFORMATION PROCESSING DEVICE PERFORMING A DATA SHARING PROCESS AMONG APPLICATIONS AND CONTROLLING METHOD THEREOF

CROSS-REFERENCE TO RELATED APPLICATION

This application is a continuation of U.S. patent application Ser. No. 14/338,723, filed Jul. 23, 2014, and further claims priority from Japanese Patent Application No. 2013-152939 filed on Jul. 23, 2013, the entire subject matter of both of which is incorporated herein by reference.

TECHNICAL FIELD

A technology to be disclosed in this disclosure relates to an information processing device, and program or controlling method thereof, etc., which are possible to share a variety of data between a plurality of applications.

BACKGROUND

Some mobile terminals have a function called a sharing function. The sharing function is a function of transmitting data processed in one application to another application to make another application process the data. For example, in a case of acquiring image data by a digital camera built in a mobile terminal and generating a JPEG file from the image data by a camera application, it is possible, by using the above described sharing function, to transmit the JPEG file to an electronic mail application. As a result the electronic mail application is possible to attach the JPEG file to an electronic mail and transmit the electronic mail. Like this, according to the sharing function, it is possible to cooperate a plurality of applications, thereby making a mobile terminal perform a variety of processes. Also, the application which processes the JPEG file is not limited to the electronic mail application. There may be a plurality of applications capable of processing JPEG files. For example there has been disclosed a technology for activating different JPEG applications according to folders holding JPEG files.

SUMMARY

In a case of using the sharing function to handle data set, which includes a plurality of data, some data set may include a plurality of data whose sharing destination applications are different from one another. In this case, if it is impossible to perform a sharing process in unit of data set, it is necessary to repeatedly perform an operation for sharing with respect to every data. Therefore, it cannot be said that usability is good.

According to one aspect of this disclosure, a non-transitory computer readable medium storing instructions, which is read in an information processing device having a data sharing unit causing an application, selected as data output destination from a plurality of applications, to process data output from a data output source application. The information processing device includes a communication interface configured to perform communication with an external device, and a processor that, when executing the instructions, performs operations comprising: acquiring an image data set from the external device through the communication interface; defining plural image data groups, each of the plural image data groups including at least one of the plurality of image data included in the image data set; selecting a plurality of the applications each of which is corresponding to each of the plural image data groups, as the output destination, respectively; and controlling the data sharing unit to perform a sharing process of causing each of the plurality of the selected applications to process the at least one of the plurality of image data included in each of the plural image data groups, respectively.

BRIEF DESCRIPTION OF THE DRAWINGS

The foregoing and additional features and characteristics of this disclosure will become more apparent from the following detailed descriptions considered with the reference to the accompanying drawings, wherein:

FIG. 5 is a flow chart illustrating a scanning process;

DETAILED DESCRIPTION

First Embodiment

Figure 1:
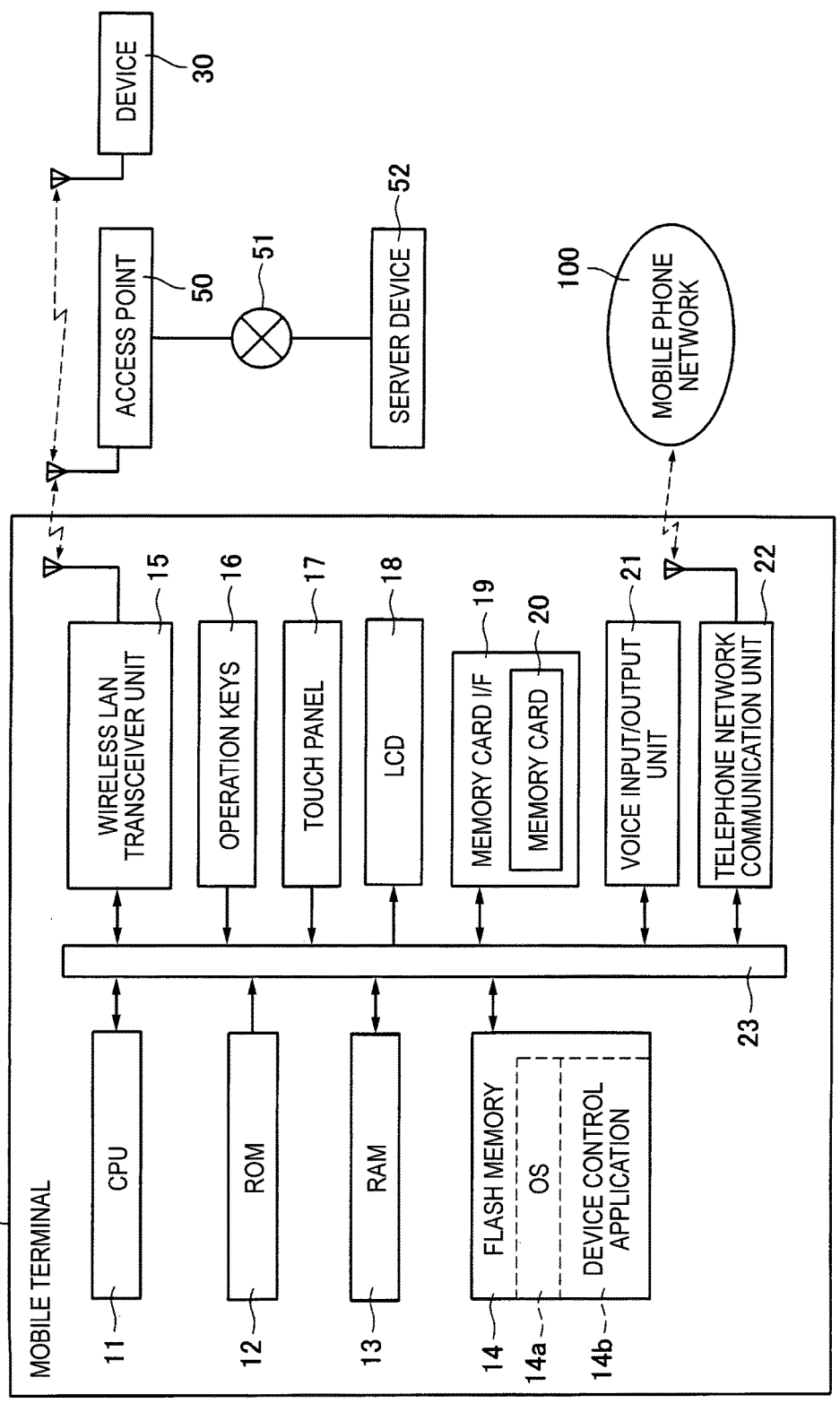
FIG. 1 is a block diagram illustrating the electrical configuration of a mobile terminal with a device control application.

Hereinafter, illustrative embodiments of this disclosure will be described for the accompanying drawings. FIG. 1 is a block diagram illustrating the electrical configuration of a mobile terminal 10 with a device control application 14b (hereinafter, also referred to as the present application 14b) which is an embodiment of this disclosure.

The mobile terminal 10 is a mobile phone capable of a voice call to another device and connecting with the Internet 51, through a mobile phone network 100 or. Also, the mobile terminal 10 performs wireless communication with a device 30 by an infrastructure mode through an access point 50. Further, the mobile terminal 10 performs a variety of communication with a server device 52 through the access point 50 and the Internet 51. The server device 52 is a device capable of storing a variety of data such as image data.

The mobile terminal 10 includes a CPU 11, a ROM 12, a RAM 13, a flash memory 14, a wireless LAN transceiver unit 15, operation keys 16, a touch panel 17, a liquid crystal display 18 (hereinafter, also referred to as LCD 18), a memory card interface 19 (hereinafter, also referred to as memory card I/F 19), a voice input/output unit 21, and a telephone network communication unit 22. These are connected to one another through a bus line 23.

The CPU 11 controls each unit connected to the bus line 23, according to fixed values, programs, and the like saved in the ROM 12 and the like. The ROM 12 is a non-rewritable non-volatile memory, and the RAM 13 is a rewritable volatile memory. The flash memory 14 is a non-rewritable non-volatile memory, and stores an operating system 14a (hereinafter, also referred to as OS 14a), the present application 14b, and a plurality of other applications (not shown). The CPU 11, the ROM 12, the flash memory 14, and the like are computer-readable storage media, and are non-transitory media. Electric signals carrying programs downloaded from a server or the like set on the Internet are not included in non-transitory media.

The OS 14a is basic software for implementing the standard functions of the mobile terminal 10. In the present embodiment, the OS 14a is an Android (registered as a trade mark) OS. The present application 14b is an application which is provided by the vender of the device 30, and is installed in the mobile terminal 10 by a user.

Attention for descriptions in this disclosure will be described. Hereinafter, the CPU 11 which executes a program such as an application or the operating system may be referred to simply as the name of the program. For example, the expression "an application" may corresponds to the CPU 11 performing the application. In this disclosure, the expression "the CPU 11 of the mobile terminal 10 receives a variety of information" includes the technology content "the CPU 11 of the mobile terminal 10 acquires a variety of information through the wireless LAN transceiver unit 15". Also, the expression "the CPU 11 of the mobile terminal 10 transmits a variety of information" will include the technology "the CPU 11 of the mobile terminal 10 outputs a variety of information through the wireless LAN transceiver unit 15".

Applications use the API of the OS 14a installed in the mobile terminal 10 to implement a sharing function (hereinafter, also referred to as intent function) of performing data communication between the applications. Also, the present application 14b installed in the mobile terminal 10 is an application for the mobile terminal 10 to directly use the printing function and scanning function of the device 30, not through a personal computer or the like. Especially, the present application 14b is configured to have good usability in a case of using the sharing function to transmit image data acquired from the device 30 to another application.

The wireless LAN transceiver unit 15 is a circuit for establishing a Wi-Fi (registered as a trade mark) connection between the mobile terminal 10 and another device by a wireless LAN based on the standards of 802.11b and 802.11g of IEEE. By the wireless LAN transceiver unit 15, the mobile terminal 10 is wirelessly connected to the device 30 through the access point 50. Also, the mobile terminal 10 is connected to the server device 52 through the access point 50 and the Internet 51.

The operation keys 16 are hard keys provided on the housing of the mobile terminal 10, and are used to input set information and instructions to the mobile terminal 10. The touch panel 17 is provided so as to overlap the LCD 18, and is used to input set information and instructions to the mobile terminal 10. The LCD 18 displays a variety of operation screens, and images based on selected data. The memory card I/F 19 is an interface to which a non-volatile memory card 20 is attached, and controls writing or reading of data into or from the memory card 20. An example of the memory card 20 is an SD card (registered as a trade mark). In the present embodiment, the present application 14b converts image data received from the device 30 into PDF files (hereinafter, also referred to as PDF data) or JPEG files (hereinafter, also referred to as JPEG data), and stores the file in the memory card 20. The format of PDF data is a data structure capable of generating one PDF data including multiple pages. The format of JPEG data is a data structure incapable of including multiple pages in one JPEG data. Here, multiple pages are data of a plurality of pages.

The voice input/output unit 21 is a voice input/output device composed of a microphone, a speaker, and the like, and the telephone network communication unit 22 is a circuit for performing communication through the mobile phone network 100. The mobile phone network 100 is a communication network based on IMT-2000 (International Mobile Telecommunication-2000), and makes it possible to use the mobile terminal 10 to perform voice communication.

Also, each application installed in the mobile terminal 10 calls the API of the OS 14a, and outputs data, to the OS 14a, desired to be transmitted to each component of the mobile terminal 10, such as the wireless LAN transceiver unit 15, the operation keys 16, the touch panel 17, the LCD 18, the memory card I/F 19, the voice input/output unit 21, or the telephone network communication unit 22. Each application includes the present application 14b. That is, each application calls the API of the OS 14a, thereby controlling each component of the mobile terminal 10. Also, each application calls the API of the OS 14a, thereby acquiring data output from each of the components of the mobile terminal 10, or data representing the states of the individual components, from the OS 14a. That is, each application calls the API of the OS 14a, thereby acquiring data representing the states of the individual components of the mobile terminal 10, from the OS 14a. The states of the individual components of the mobile terminal 10 include the states of input operations on the mobile terminal 10. Also, regularly, or whenever the states of the individual components are changed, the OS 14a notify each application of data output from the individual components of the mobile terminal 10, and data representing the states of the individual components. That is, each application receives a notification from the OS 14a, thereby acquiring data representing the states of the individual components of the mobile terminal 10, from the OS 14a.

The device 30 is a multi-function device having a printer function, a scanning function, a copying function, and the like, and includes a wireless LAN transceiver unit (not shown) configured similarly to the wireless LAN transceiver unit 15 of the mobile terminal 10, and establishes a Wi-Fi connection with the mobile terminal 10 by wireless communication through the access point 50. Also, the device 30 is controlled by the present application 14b of the mobile terminal 10, thereby printing images based on data transmitted from the mobile terminal 10, or reading documents, thereby generating image data, and transmitting the image data to the mobile terminal 10. The device 30 may include an ADF (Auto Document Feeder). The device 30 may be configured such that if a plurality of documents is set and one scanning instruction is input to the device 30, the plurality of documents is automatically scanned, whereby a plurality of image data is generated. Here, a set of a plurality of image data which is generated in response to one scanning instruction is defined as an image data set. Also, each of one or more image data included in an image data set may be associated with a characteristic of the corresponding image data. As the characteristic of an image data, an image size (such as an A4 size or an L size), an image kind (such as a text image or a photographic image), or the like can be exemplified. The characteristic of an image data may include information on the header of the image data.

Here, the definitions of the terms "data" and "information" will be described. Of the terms "data" and "information", the term "information" is used as a broader concept than the term "data". Therefore, "A data" can be restated as "A information". Also, "B data" obtained by duplicating or converting the "A data" is the "A information" as long as the "B data" is used in the same meaning as that of the "A data".

Figure 2A:
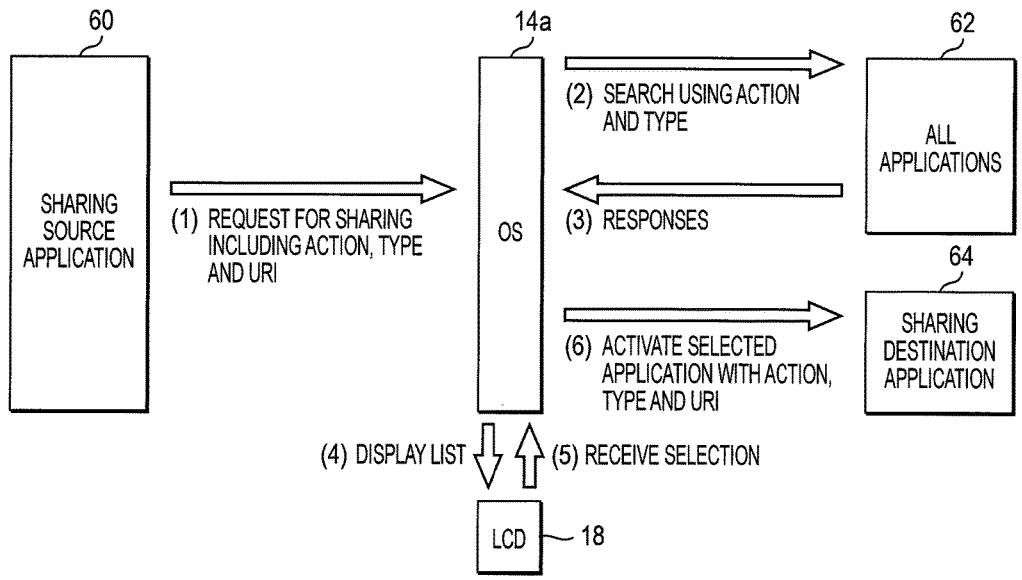
FIGS. 2A and 2B are views illustrating sharing functions.
Figure 2B:
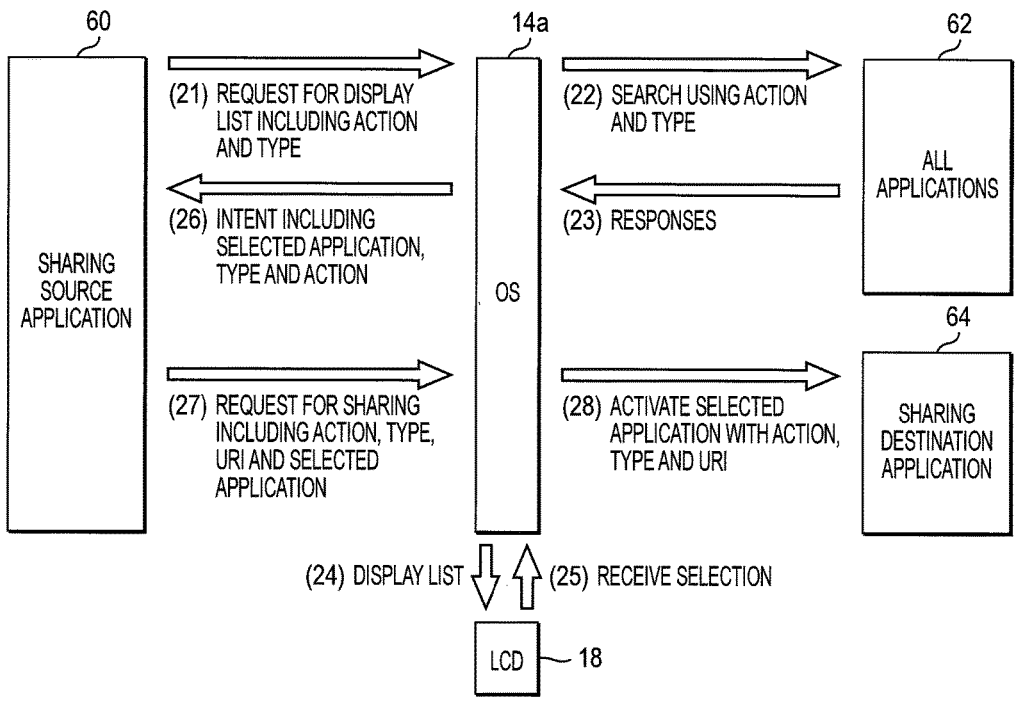

With reference to FIGS. 2A and 2B, sharing functions which are implemented by using the API of the OS 14a of the mobile terminal 10 will be described. A sharing function is a function causing an application, which is selected as a data output destination, to process data output from another application which is a data output source. As sharing functions, there are an implicit sharing function and an explicit sharing function. FIG. 2A is a view illustrating the implicit sharing function, and shows a process flow in a case where an application which is a data output source (hereinafter, also referred to as sharing source application 60) requests the OS 14a to perform the implicit sharing function.

As shown in FIG. 2A, in the implicit sharing function, in Step (1), the sharing source application 60 calls the API of the OS 14a and requests execution of the sharing function. This request includes the URI (Uniform Resource Identifier), type and an action of data (hereinafter, also referred to as shared data) to be processed in another application by the sharing function. The URI is information representing the location of the shared data, and is composed of a file path in the present embodiment. The type is information designating the format of the shared data, and the action is information designating a process kind. In Step (2), the OS 14a sets the type and the action notified from the sharing source application 60, as search criteria, and searches all applications (hereinafter, also referred to as all applications 62) installed in the mobile terminal 10, for candidates capable of becoming a data output destination application (hereinafter, also referred to as sharing destination application 64).

Each application installed in the mobile terminal 10 declares a type designating a format which can be processed by the corresponding application, and an action designating the kind of a performable process, in advance. Therefore, the OS 14a searches the type and the action notified from the sharing source application 60, as search criteria, from all applications 62. As a result, the OS 14a extracts applications which can processes data of the format designated by the type notified from the sharing source application 60 and correspond to the process kind designated by the action notified from the sharing source application 60, and acquires the identification information of the extracted applications in Step (3). However, a type and an action to be declared by each application can be freely set by the developer of the corresponding application. Therefore, each application may be declaring a process which the corresponding application cannot actually perform, as an action. As a result, each application corresponding to the process kind designated by the action notified from the sharing source application 60 means an application declaring the same action as the action notified from the sharing source application 60, and does not necessarily need to be actually able to perform the corresponding process.

Next, in Step (4), the OS 14a causes the LCD 18 to display the list of the searched applications, that is, the applications which are candidates for the sharing destination application 64. Then, if the user selects any one from the list (Step (5)), in Step (6), the OS 14a activates the selected sharing destination application 64, and sets the screen of the sharing destination application 64 for the foreground (also referred to as front), and notifies the URI, the type, and the action of the shared data notified from the sharing source application 60.

As a result, the screen of the sharing destination application 64 selected by the user is displayed in the foreground, and the sharing destination application 64 accesses to the shared data specified by the notified URI, and performs a process according to the value of the action. The sharing destination application 64 can perform a variety of processes, such as a displaying process, a process of attaching the shared data to an electronic mail and transmitting the electronic mail, or an editing process.

FIG. 2B is a view illustrating the explicit sharing function, and shows a process flow in a case where the sharing source application 60 requests the OS 14a to perform the explicit sharing function.

As shown in FIG. 2B, in the explicit sharing function, in Step (21), a sharing source application 60 calls the API of the OS 14a, and requests to display of the list of candidates for a sharing destination application 64. This request includes the type and an action of shared data. The OS 14a searches the type and the action notified from the sharing source application 60, as search criteria, from all applications 62 installed in the mobile terminal 10, for candidates for the sharing destination application 64, in Step (22), and acquires the identification information of applications satisfying the search criteria, in Step (23).

Next, in Step (24), the OS 14a causes the LCD 18 to display the list of the searched candidates for the sharing destination application 64. Then, if the user selects any one from the list (Step (25)), in Step (26), the OS 14a returns intent including the identification information of the selected application, and the type and the action used as the search criteria. Meanwhile, if receiving the intent from the OS 14a, in Step (27), the sharing source application 60 calls the API of the OS 14a, and designates the identification information of the selected application, the URI and type of the shared data, and the action, included in the intent, and requests performance of the sharing function. Then, in Step (28), the OS 14a activates the sharing destination application 64 which is an application designated from the sharing source application 60, and sets the screen of the sharing destination application 64 for the foreground, and notifies the URI, type and the action of the shared data notified from the sharing source application 60.

That is, a sharing function of a sharing source application 60 to notify the URI of shared data and the like to the OS 14a without recognizing a sharing destination application 64 is an implicit sharing function, and a sharing function of a sharing source application 60 to designate a sharing destination application 64 and notify the URI of shared data and the like to the OS 14a is an explicit sharing function. Also, the present application 14b will be described on the assumption that the present application 14b uses the explicit sharing function of the OS 14a.

FIG. 5 is a flow chart illustrating a scanning process which the CPU 11 of the mobile terminal 10 performs according to the present application 14*b*. This process starts in a case where the user issues a scanning instruction from an operation receiving screen (not shown) of the present application 14*b*. Also, on the assumption that the present application 14*b* causes the CPU 11 to perform the individual Steps shown in the flow charts of FIGS. 5 to 9 to be described below, or the present application 14*b* causes the CPU 11 to use the functions of the OS 14*a* and the like to perform the Steps, the Steps will be described. However, some Steps of each flow chart may be replaced with Steps which the OS 14*a* or another application causing the CPU 11 to perform that. Also, some Steps of each flow chart may be replaced with Steps which are implemented by operations of hardware of the mobile terminal 10 without the operation of the CPU 11.

First, in Step S402, the CPU 11 makes the wireless LAN transceiver unit 15 instruct the device 30 to transmit image data. Meanwhile, in response to the instruction from the mobile terminal 10, the device 30 scans one or more documents, thereby generating one image data set including one or more image data, and transmits the image data set to the mobile terminal 10. If receiving the image data set from the device 30, the mobile terminal 10 temporarily stores the image data set in the RAM 13. In the present embodiment, it is assumed that each of the one or more image data is a uncompressed or losslessly compressed raw image data. While the device 30 is performing the scanning ("NO" in Step S404), the CPU 11 waits for further process. If the device 30 completes the scanning ("YES" in Step S404), the CPU 11 completes reception of the image data set.

Figure 3A:
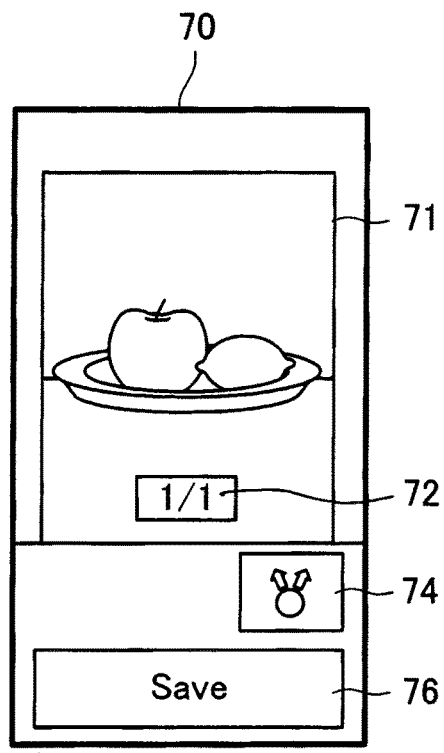
FIG. 3A is a view illustrating a screen example of a scanning result confirmation screen.

In Step S406, the CPU 11 controls the LCD 18 such that the LCD 18 displays a scanning result confirmation screen 70. FIG. 3A shows a screen example of the scanning result confirmation screen 70. The scanning result confirmation screen 70 includes a scanned image 71, a page display area 72, a sharing button 74, and a save button 76. The scanned image 71 is an image corresponding to an image data generated by the scanning process. The page display area 72 is an area for displaying the total number of pages of documents read in the device 30, and a page number representing what number the page of the displayed scanned image 71 is in the documents of all pages. The sharing button 74 is an area for inputting an instruction for a sharing function. If the user touches the sharing button 74, the image data corresponding to the displayed scanned image 71 is determined as a shared data. The save button 76 is an area for inputting an instruction for storing function. If the user touches the save button 76, storing of the image data corresponding to the displayed scanned image 71 is performed. Specifically, the CPU 11 converts the image data into a data of a predetermined format, and calls the API of the OS 14*a*, thereby storing the data in the memory card 20.

Thereafter, if any operation is not input ("NO" in Step S408), the CPU 11 waits for further process. Meanwhile, if an operation is performed on the operation keys 16 or the touch panel 17 ("YES" in Step S408), and an instruction for performing a function other than the sharing function is input ("NO" in Step S410), the CPU 11 performs a process (for example, an image data storing process) according to the operation input, in Step S412, and finishes the scanning process. If the scanning process finishes, the CPU 11 controls the LCD 18 such that the LCD 18 displays an operation receiving screen (not shown) of the present application 14*b*.

Meanwhile, if an instruction for a sharing function is input ("YES" in Step S410), in Step S414, the CPU 11 controls the LCD 18 such that the LCD 18 displays a format selection screen 77, thereby enabling the user to select any one of a JPEG format and a PDF format. The device 30 can read a variety of documents such as photographic images and text documents. As a result, in order to generate a data in a format appropriate for the content of the image data, the user is enabled to select any one format.

Figure 3B:
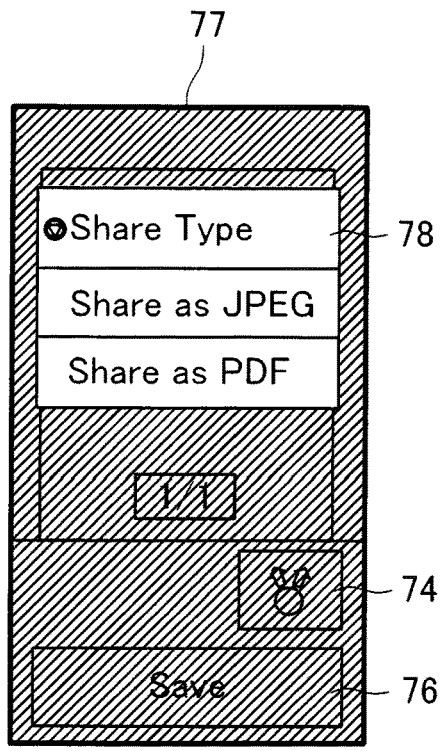
FIG. 3B is a view illustrating a screen example of a format selection screen.

FIG. 3B shows a screen example of the format selection screen 77. A format selection area 78 includes options for enabling the user to select any one of the PDF format and the JPEG format. The user selects any one format for an image data to be shared with another application, and performs a selecting operation of touching the option of the selected format. In the format selection screen 77, only the format selection area 78 receives an operation, and the sharing button 74 and the save button 76 are displayed in a grayed out state to not receive any user's operation.

Thereafter, while any format is not selected ("NO" in Step S416), the CPU 11 waits for the selection. Meanwhile, if the touch panel 17 receives an instruction designating the PDF format ("PDF" in Step S416), in Step S430, the CPU 11 generates a PDF data based on the image data acquired from the device 30. In a case of causing the device 30 to scan documents of a plurality of pages, the mobile terminal 10 acquires a plurality of image data from the device 30. In this case, the CPU 11 generates one PDF data including data of the plurality of pages, based on the plurality of image data.

Meanwhile, in a case where the touch panel 17 receives an instruction designating the JPEG format ("JPEG" in Step S416), if one image data has been acquired from the device 30, that is, if the device 30 has scanned a document of one page ("NO" in Step S418), in Step S428, the CPU 11 generates one JPEG data based on the acquired image data.

Meanwhile, if a plurality of image data has been acquired from the device 30, for example, if the device 30 has scanned documents of a plurality of pages ("YES" in Step S418), in Step S420, the CPU 11 generates a plurality of JPEG data based on the plurality of image data, respectively.

Figure 3C:
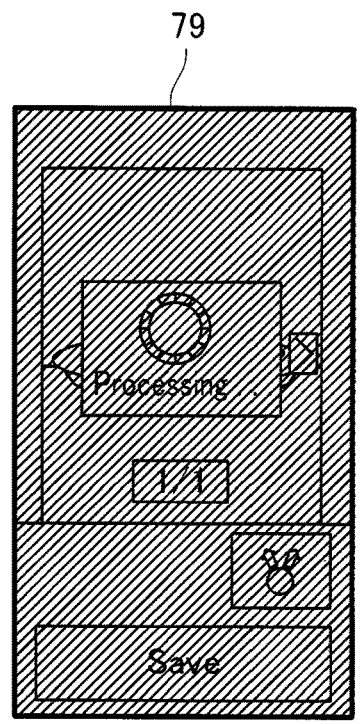
FIG. 3C is a view illustrating a screen example of a screen indicating that data generation is being processed.

Next, in Step S422, the CPU 11 controls the LCD 18 such that the LCD 18 displays a screen 79 indicating that data generation is being processed. FIG. 3C shows a screen example of the screen 79 indicating that data generation is being processed. While the screen 79 indicating that data generation is being processed is being displayed, the CPU 11 generates a process target data in the selected format, and calls the API of the OS 14*a*, whereby the process target data is saved in the memory card 20. Also, while the screen 79 indicating that data generation is being processed is being displayed, the mobile terminal 10 cannot receive any user's operation.

Further, if the process target data (at least one JPEG data is being generated in Step S420 or S428, or one PDF data is being generated in Step S430) ("NO" in Step S424) is being generated, the CPU 11 repeats processes from Step S422. In the present embodiment, the CPU 11 gives a file name to the generated process target data, and stores the generated process target data as a file in the memory card 20. A process target data generating period means a period from when generation of a process target data starts to when a file including the process target data is written in the memory card 20 and is closed. Examples of the given file name include "photo.jpg", "photo1.jpg", "image1.jpg", "image2.jpg", and "document.pdf". If generation of the process target data is completed ("YES" in Step S424), in Step S426, the CPU 11 performs a sharing process.

The sharing process of Step S426 will be described for FIG. 6. The sharing process is a process for sharing a variety of data with the sharing destination application 64. As described above for FIG. 5, the sharing process starts after the generation of the process target data is completed.

In Step S600, the CPU 11 designates the process target data saved in the memory card 20, as a shared data. In Step S602, the CPU 11 confirms the shared data format selected in Step S416. In a case where the shared data format is the PDF format ("PDF" in Step S602), the CPU 11 proceeds to Step S604. In Step S604, the CPU 11 determines whether any application capable of handling the PDF format exists in candidates for the sharing destination application 64. Specifically, the CPU 11 requests the OS 14a to search for applications capable of processing PDF data. In a case where the OS 14a returns information including the identification information of an application capable of handling the PDF format, the CPU 11 determines that there is an application capable of handling the PDF format. Meanwhile, in a case where the OS 14a does not return any information including the identification information of an application capable of handling the PDF format, the CPU 11 determines that there is not any application capable of handling the PDF format. Examples of information including the identification information of an application include an application name which is included in intent of an Android (registered as a trade mark) OS. In a case where there is not any application capable of handling the PDF format ("NO" in Step S604), the CPU 11 proceeds to Step S605.

In Step S605, the CPU 11 controls the LCD 18 such that the LCD 18 displays a screen indicating that there is not any application capable of handling the PDF format. Then, the CPU 11 proceeds to Step S606. In Step S606, the CPU 11 converts the shared data of the PDF format into a JPEG format data, and designates the JPEG format data, instead of the shared data of the PDF format, as a new shared data. Then, the CPU 11 returns to Step S602. Alternatively, in Step S606, the CPU 11 may convert the image data generated based on the shared data of the PDF format, into a JPEG format data, and designate the JPEG format data as a new shared data.

Meanwhile, in a case where it is determined in Step S604 that there is an application capable of handling the PDF format ("YES" in Step S604), the CPU 11 proceeds to Step S608. In Step S608, the CPU 11 calls the API of the OS 14a, and designates the identification information of the sharing destination application 64 capable of handling the PDF format, the URI, the type "PDF", and an action "SEND_MULTI" of the shared data, and requests the OS 14a to perform an explicit sharing function. Then, the CPU 11 finishes the flow. Here, the action "SEND_MULTI" is information designating a process kind with respect to a plurality of corresponding applications.

Meanwhile, in a case where it is determined in Step S602 that the shared data format selected in Step S416 is the JPEG format ("JPEG" in Step S602), the CPU 11 proceeds to Step S610. In Step S610, the CPU 11 determines whether the number of JPEG data designated as shared data is two or more. In a case where the number of JPEG data is one ("NO" in Step S610), the CPU 11 proceeds to Step S611.

In Step S611, the CPU 11 receives intent including the identification information of a sharing destination application 64 capable of handling the JPEG format, from the OS 14a. In this case, the sharing destination application 64 is a single-data handling application. Specifically, the CPU 11 requests the OS 14a to search for applications capable of processing JPEG format data, and receives intent including the identification information of an application capable of handling the JPEG format, from the OS 14a. Also, in the present embodiment, it is assumed a case where at least one application capable of handling the JPEG format had been installed in the mobile terminal 10 before shipment from a factory. The CPU 11 calls the API of the OS 14a, and designates the identification information of the sharing destination application 64 capable of handling the JPEG format, the URI, the type "JPEG", and an action "VIEW" of the shared data which is one JPEG data, and requests the OS 14a to perform an explicit sharing function. Then, the CPU 11 finishes the flow.

Meanwhile, the OS 14a requested to perform the sharing function displays the screen of the sharing destination application 64 in the foreground (also referred to as front) while displaying the screen of the present application 14b which is the sharing source application 60, in the background (also referred to as rear) of the screen of the sharing destination application 64. Then, the present application 14b becomes a standby state. Thereafter, if the process of the sharing destination application 64 finishes, the OS 14a displays the screen of the present application 14b in the foreground (also referred to as front). Then, the present application 14b becomes an operating state. That is, the present application 14b becomes the operating state, and then finishes the flow. Here, the action "VIEW" is information designating a data displaying process. Also, in the present embodiment, it is assumed that, in applications installed in the mobile terminal 10, at least applications installed in the mobile terminal 10 before shipment from the factory and capable of handling the JPEG format can handle the action "VIEW". Also, in the present circumstances, it often happens that applications capable of handling the JPEG format can handle the action "VIEW".

Meanwhile, in a case where it is determined in Step S610 that there is a plurality of JPEG data ("YES" in Step S610), the CPU 11 proceeds to Step S612. In Step S612, the CPU 11 determines whether there is any multi-data handling application capable of processing a plurality of data. Specifically, the CPU 11 requests the OS 14a to search for applications capable of processing JPEG format data and capable of handling the action "SEND_MULTI". Also, the action "SEND_MULTI" is an action which only multi-data handling applications are declaring. In a case where the OS 14a returns information including the identification information of any multi-data handling application, the CPU 11 determines that there is any multi-data handling application. Meanwhile, in a case where the OS 14a does not return any information including the identification information of any multi-data handling application, the CPU 11 determines that there is no multi-data handling application. If any multi-data handling application is not searched for ("NO" in Step S612), the CPU 11 proceeds to Step S620. Otherwise ("YES" in Step S612), the CPU 11 proceeds to Step S613.

Figure 3D:
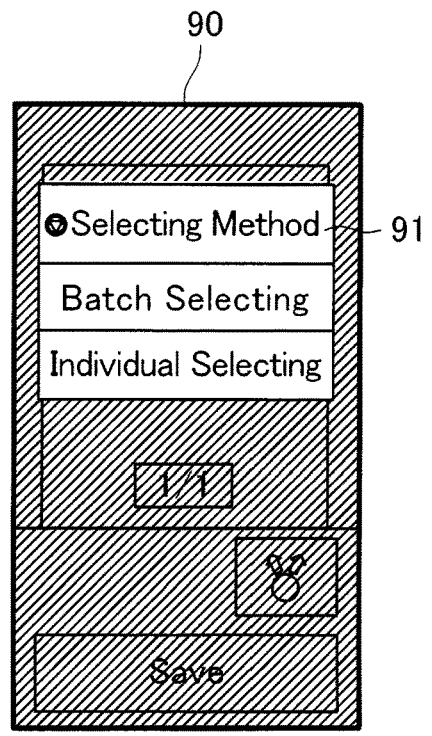
FIG. 3D is a view illustrating a screen example of a selection screen.

In Step S613, the CPU 11 displays an application-selecting-method selection screen 90. FIG. 3D shows a screen example of the selection screen 90. A selection area 91 is an area for receiving an instruction as to which of a batch selecting process and an individual selecting process is to be performed. The batch selecting process is a process of collectively selecting one sharing destination application 64 with respect to all of a plurality of process target data. The individual selecting process is a process of individually selecting a sharing destination application 64 with respect to each of a plurality of process target data.

In Step S614, the CPU 11 determines the input instruction content. In a case where an instruction for performing the batch selecting process has been input ("BATCH SELECTING" in Step S614), the CPU 11 proceeds to Step S615. In Step S615, the CPU 11 controls to display the list of the names 82 of searched applications in a sharing destination application list screen 81.

Figure 3E:
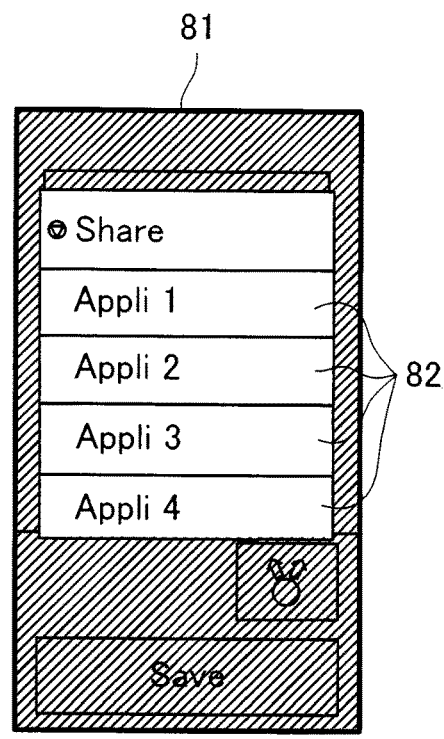
FIG. 3E is a view illustrating a screen example of a sharing destination application list screen.

FIG. 3E shows a screen example of the sharing destination application list screen 81. In the sharing destination application list screen 81, the list of applications selectable as data output destinations by the sharing function is displayed. Specifically, the CPU 11 requests the OS 14a to search for applications capable of processing JPEG format data and capable of handling the action "SEND_MULTI", and display the list of searched applications in the sharing destination application list screen 81. If receiving the list display request, the OS 14a searches for candidates for the sharing destination application 64 (FIGS. 2A and 2B), and controls the LCD 18 such that the LCD 18 displays the sharing destination application list screen 81 including the list of the names 82 of searched multi-data handling applications. In this way, the sharing destination application list screen 81 is displayed on the LCD 18. As a result, the user can select a multi-data handling application capable of performing a process of collectively sharing the plurality of JPEG data, from the sharing destination application list screen 81.

In Step S616, the CPU 11 determines whether any sharing destination application 64 has been selected. Specifically, in a case where intent including the identification information of a sharing destination application 64 selected in the sharing destination application list screen 81 has been received from the OS 14a, the CPU 11 determines that the sharing destination application 64 which is a multi-data handling application has been selected ("YES" in Step S616), and proceeds to Step S618. In Step S618, the CPU 11 calls the API of the OS 14a, and designates the identification information of the sharing destination application 64, the URIs of the plurality of shared data which are JPEG data, the type "JPEG", and the action "SEND_MULTI", and requests the OS 14a to perform an explicit sharing function. Then, the CPU 11 finishes the flow.

Figure 6:
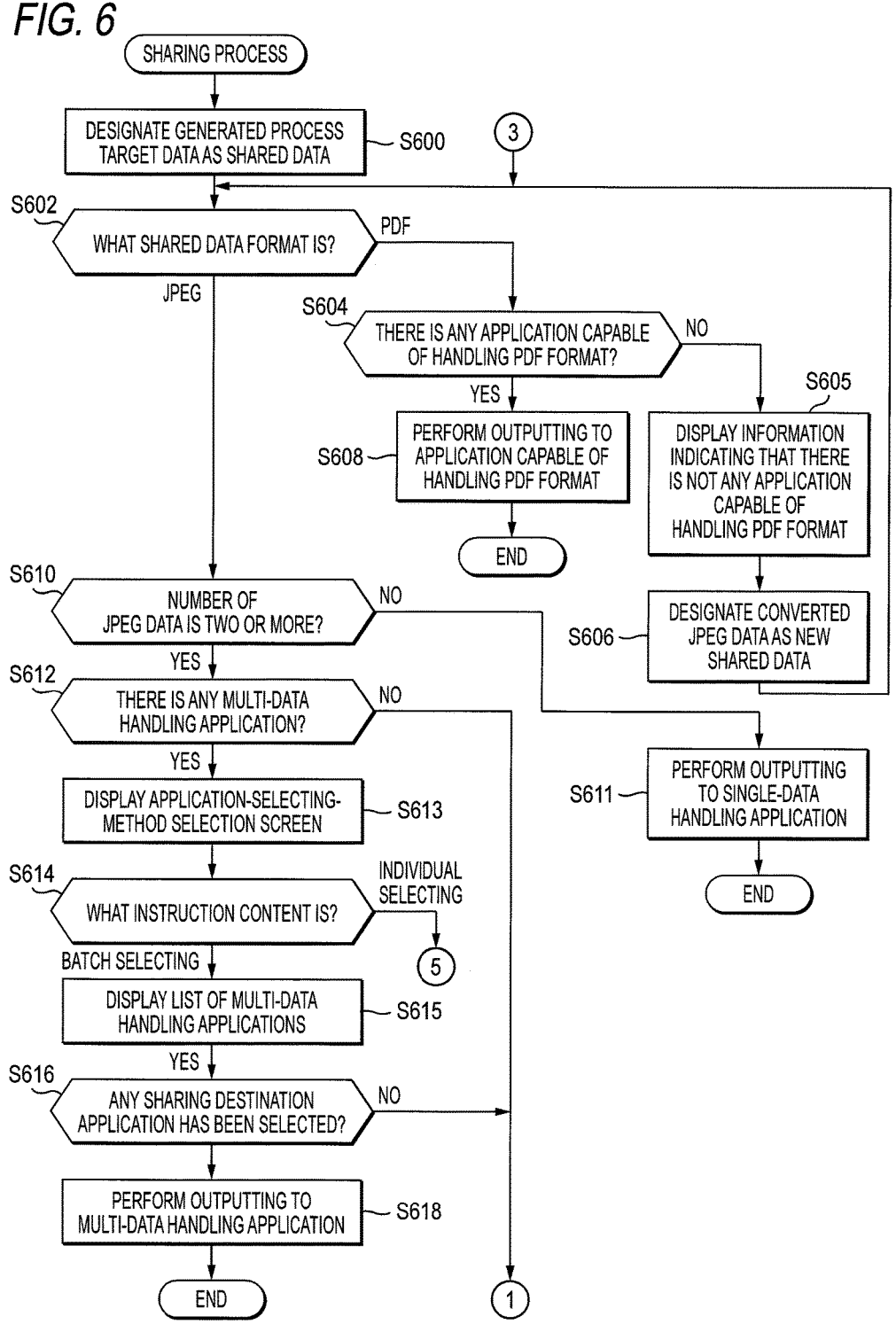
FIG. 6 is a flow chart illustrating a sharing process.
Figure 7:
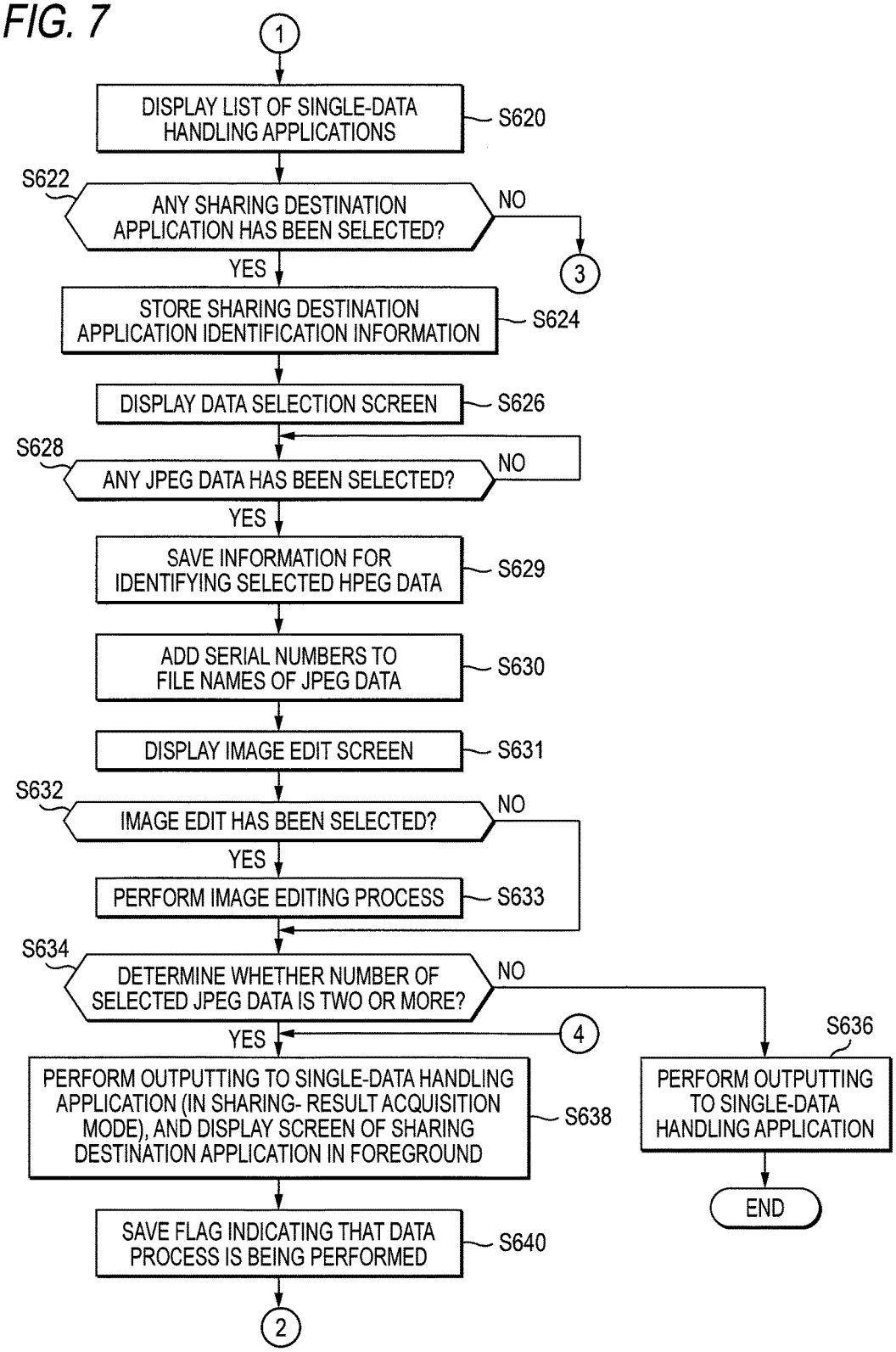
FIG. 7 is another flow chart illustrating the sharing process.

Meanwhile, in a case where any intent has not been received from the OS 14a, the CPU 11 determines that any sharing destination application 64 has not been selected ("NO" in Step S616), the CPU 11 proceeds to Step S620 (FIG. 7). In Step S620, the CPU 11 controls to display the list of the names 82 of single-data handling applications capable of processing only single data, in the sharing destination application list screen 81. Specifically, the CPU 11 requests the OS 14a to search for applications capable of processing JPEG format data, and display the list of searched applications in the sharing destination application list screen 81. In response to this request, applications which cannot handle the action "SEND_MULTI" but can process JPEG format data are also listed in the sharing destination application list screen 81. In Step S622, the CPU 11 determines whether any sharing destination application 64 has been selected. Specifically, in a case where any intent has not been received from the OS 14a, the CPU 11 determines that any sharing destination application 64 has not been selected ("NO" in Step S622), and returns to Step S602 (FIG. 6). Meanwhile, in a case where intent including the identification information of a sharing destination application 64 selected in the sharing destination application list screen 81 has been received from the OS 14a, the CPU 11 determines that the sharing destination application 64 which is a single-data handling application has been selected ("YES" in Step S622), and proceeds to Step S624. In Step S624, the CPU 11 stores a sharing destination application identification information which is the identification information of the selected sharing destination application 64, in the flash memory 14. The sharing destination application identification information may be, for example, an ID information for identifying the application kind of the sharing destination application 64.

Figure 4A:
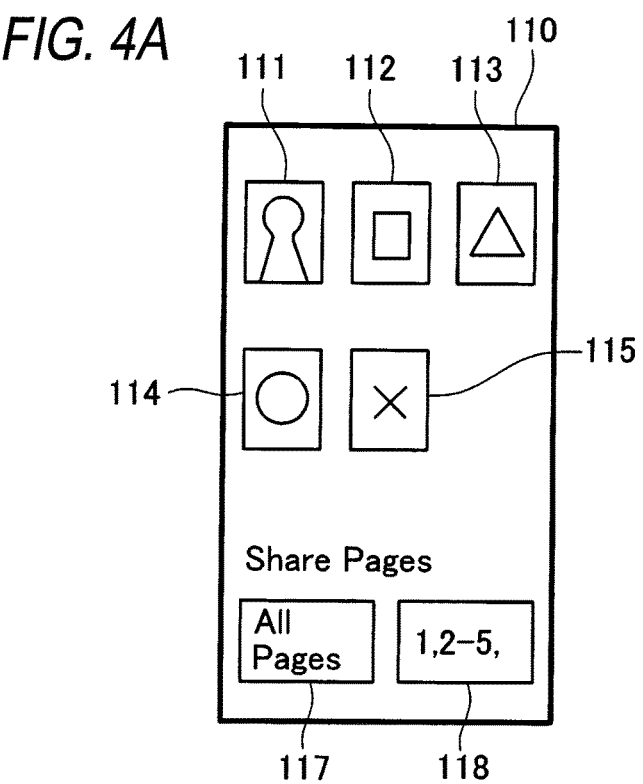
FIG. 4A is a view illustrating a screen example of a data selection screen.

In Step S626, the CPU 11 controls the LCD 18 to display a data selection screen 110. In the data selection screen 110, the list of thumbnail images relative to all JPEG data designated as shared data in Step S600 is displayed. FIG. 4A shows a screen example of the data selection screen 110. The data selection screen 110 of FIG. 4A shows a case where the number of JPEG data designated as shared data is five, as an example. The data selection screen 110 includes thumbnail images 111 to 115, an all-page selection button 117, and a page input area 118. The thumbnail images 111 to 115 are identification images for identifying the shared data, respectively. The thumbnail images 111 to 115 correspond to thumbnail images of first to fifth pages, respectively.

The all-page selection button 117 is an area for inputting an instruction for selecting JPEG data corresponding to all of the displayed thumbnail images, as data to be output to the sharing destination application 64. If the user touches the all-page selection button 117, the JPEG data corresponding to the thumbnail images 111 to 115 are selected. The page input area 118 is an area for inputting the page numbers of thumbnail images selected from the plurality of thumbnail images. If the user inputs the page numbers of thumbnail images into the page input area 118, the JPEG data of the thumbnail images corresponding to the input page numbers are selected. For example, in a case where page numbers 1 and 3 to 5 are input into the page input area 118, an JPEG data corresponding to the thumbnail image 111 of the first page, and JPEG data corresponding to the thumbnail images 113 to 115 of the third to fifth pages are selected. In this way, the user can select JPEG data to be output to the sharing destination application 64, from the plurality of JPEG data.

While any JPEG data is not selected in Step S628 ("NO" in Step S628), the CPU 11 waits for further process. Meanwhile, if the touch panel 17 receives a JPEG data selection instruction ("YES" in Step S628), the CPU 11 proceeds to Step S629. In Step S629, the CPU 11 stores information for identifying all selected JPEG data, in the flash memory 14. For example, the CPU 11 may save the file names of all selected JPEG data.

In Step S630, the CPU 11 adds serial numbers to the file names of all selected JPEG data, respectively. For example, in a case where two JPEG data having file names "photo1.jpg" and "document1.jpeg" have been selected, the CPU 11 may add serial numbers to the file names, such as "photo1-1.jpg" and "document1-2.jpg".

In Step S631, the CPU 11 controls the LCD 18 to display an image edit screen. At this time, the CPU 11 controls the LCD 18 to display the thumbnail image of an JPEG data with a file name including the first number of the serial numbers, as a process target thumbnail image 201.

The image edit screen may include a process target thumbnail image, a rotation process button, a monochromization process button, and a sepia process button. The process target thumbnail image is a reduced image representing the content of one JPEG data to be processed in a single-data handling application. The rotation process button is an area for inputting an instruction for performing a process of rotating the orientation of a JPEG data (for example, a process of converting the orientation between a vertical orientation and a horizontal orientation). The monochromization process button is an area for inputting an instruction for performing a process of converting a JPEG data into a monochrome JPEG data. The sepia process button is an area for inputting an instruction for performing a process of converting a JPEG data into a sepia tone JPEG data. The sepia tone is a blackish brown tone. If the user touches any one of the rotation process button, the monochromization process button, and the sepia process button, a process corresponding to the touched button is performed on a JPEG data corresponding to the displayed process target thumbnail image.

In Step S632, the CPU 11 determines whether image edit has been selected. In a case where the user has not perform any operation input ("NO" in Step S632), the CPU 11 proceeds to Step S634. Meanwhile, if the user touches any one of the rotation process button 202, the monochromization process button 203, and the sepia process button 204, that is, if an image edit instruction input is received ("YES" in Step S632), the CPU 11 proceeds to Step S633. In Step S633, the CPU 11 performs an image editing process instructed by touching any one of the rotation process button 202, the monochromization process button 203, and the sepia process button 204, on the JPEG data corresponding to the process target thumbnail image 201.

In Step S634, the CPU 11 determines whether a plurality of JPEG data are selected in Step S628. In a case where the number of selected JPEG data is one ("NO" in Step S634), the CPU 11 proceeds to Step S636. In Step S636, the CPU 11 calls the API of the OS 14a, and designates the identification information of the sharing destination application 64 which is a single-data handling application, the URI, the type "JPEG", and the action "VIEW" of one shared data which is a JPEG data, and requests the OS 14a to perform an explicit sharing function. Then, the CPU 11 finishes the flow.

Meanwhile, in a case where the plurality of JPEG data are selected in Step S628 ("YES" in Step S634), the CPU 11 proceeds to Step S638. In Step S638, the CPU 11 calls the API of the OS 14a, and designates the identification information of the sharing destination application 64 which is a single-data handling application, the URI, the type "JPEG", and the action "VIEW" of a shared data which is one JPEG data of the plurality of selected JPEG data, and requests the OS 14a to perform an explicit sharing function. This request for performing the sharing function is performed in a sharing-result acquisition mode. The sharing-result acquisition mode is a mode that, in response to that a process on one JPEG data is completed in the sharing destination application 64, the sharing destination application 64 is controlled to notify the sharing source application 60 of the completion of the process and the sharing source application 60 is capable of receiving the completion notification. Also, the OS 14a requested to perform the sharing function displays the screen of the sharing destination application 64 in the foreground and displays the screen of the present application 14b which is the sharing source application 60, in the background of the screen of the sharing destination application 64. Then, the present application 14b becomes a standby state.

Figure 8:
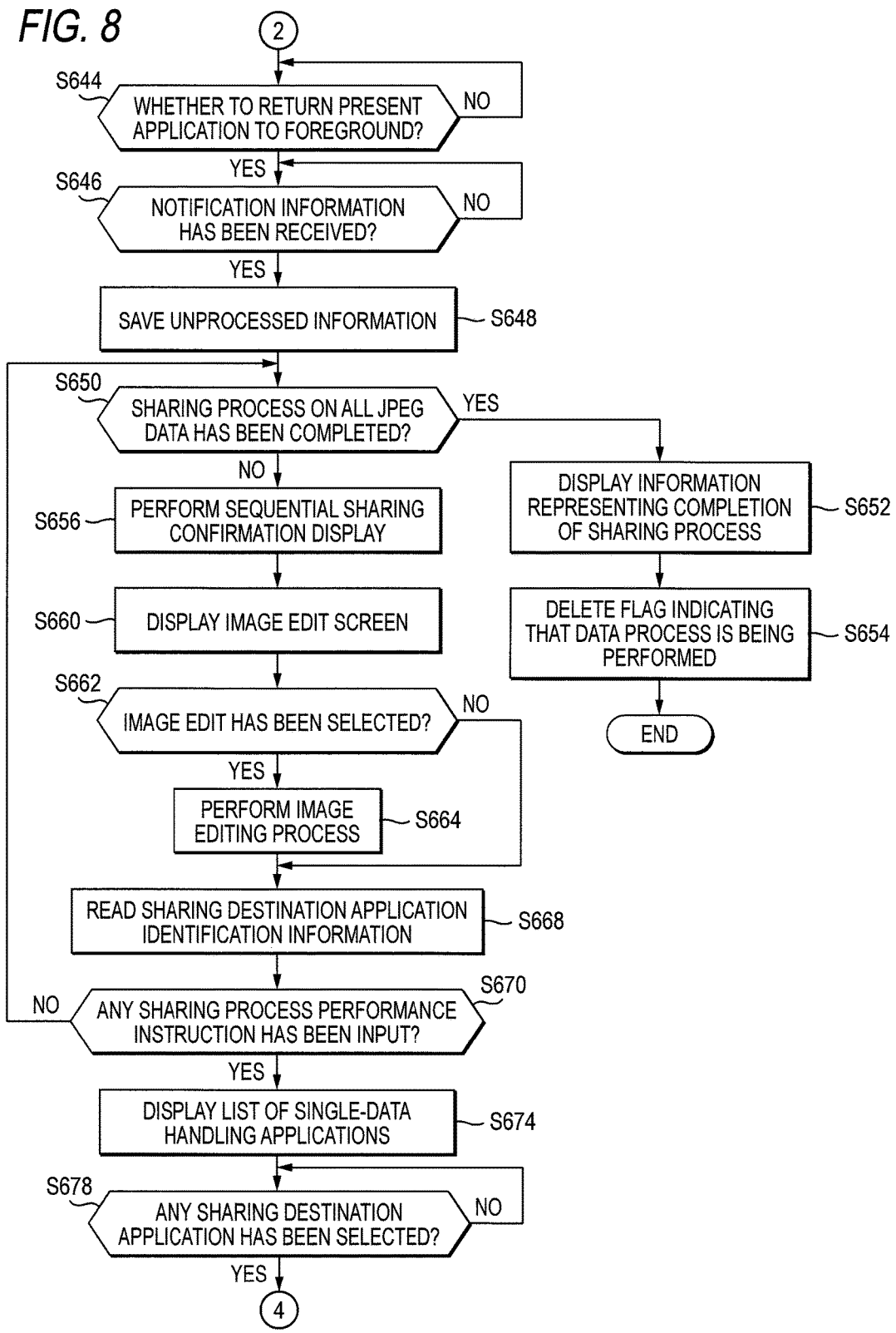
FIG. 8 is another flow chart illustrating the sharing process.

In Step S640, the CPU 11 stores a flag indicating that a data process is being performed in the sharing destination application 64, in the flash memory 14. Also, the CPU 11 stores unprocessed information representing that the process has not been performed, in association with each of the plurality of selected JPEG data, in the flash memory 14. Based on the unprocessed information, the CPU 11 can recognize which JPEG data of the plurality of selected JPEG data have not been processed in the sharing destination application 64. For example, based on the unprocessed information, the CPU 11 can recognize what page is a last processed page of processed JPEG data of the plurality of JPEG data. The unprocessed information may be, for example, information representing the page numbers of unprocessed JPEG data. Alternatively, the unprocessed information may be information representing the total number of pages of the JPEG data, and processed page numbers. Also, for example, the unprocessed information may be the file names of unprocessed JPEG data. Then, the CPU 11 proceeds to Step S644 (FIG. 8).

In Step S644, the CPU 11 determines whether to return the present application 14b which is the sharing source application 60 to the foreground. This determination may be performed based on whether event having content to return the sharing source application 60 to the foreground has been received from the OS 14a. In a case where it is determined not to return ("NO" in Step S644), the CPU 11 waits for the further process. Meanwhile, in a case where it is determined to return ("YES" in Step S644), the CPU 11 proceeds to Step S646.

In Step S646, the CPU 11 determines whether any notification information based on the sharing-result acquisition mode has been received from the sharing destination application 64. Notification information may be, for example, ID information for identifying the application kind of the sharing destination application 64. Alternatively, notification information may be information representing completion of the process on one JPEG data, or a request for transmitting the next JPEG data. In a case where any notification information has not been received ("NO" in Step S646), the CPU 11 waits for further process, and if notification information is received ("YES" in Step S646), the CPU 11 proceeds to Step S648.

In Step S648, the CPU 11 updates the unprocessed information to be recognized that the process on the shared data designated in the API of the OS 14a in Step S638 has been completed. Specifically, the CPU 11 may delete the page number of the shared data designated in the API of the OS 14a in Step S638, from information representing the page numbers of unprocessed JPEG data. Alternatively, the CPU 11 may add the page number of the shared data designated in the API of the OS 14a in Step S638, to information representing the page numbers of processed JPEG data. Also, the CPU 11 may delete the file name of the shared data designated in the API of the OS 14a in Step S638, from information representing that the file names of unprocessed JPEG data.

In Step S650, based on the unprocessed information, the CPU 11 determines whether the sharing process has been completed for all of the plurality of selected JPEG data. Specifically, if information representing the page numbers of unprocessed JPEG data has not been saved, the CPU 11 may determine that the sharing process has been completed. Alternatively, for example, if the information representing the page numbers of processed JPEG data includes the page numbers of all JPEG data, the CPU 11 may determine that the sharing process has been completed. Also, for example, if information representing the file names of unprocessed JPEG data has not been saved, the CPU 11 may determine that the sharing process has been completed. In a case where the sharing process has not been completed for all JPEG data ("NO" in Step S650), the CPU 11 proceeds to Step S656. In Step S656, the CPU 11 controls the LCD 18 such that the LCD 18 performs a sequential sharing confirmation display. The sequential sharing confirmation display is a display for notifying the user that the process for sharing a plurality of JPEG data, one by one, with the sharing destination application 64 will be sequentially performed multiple times.

In Step S660, the CPU 11 controls the LCD 18 to display an image edit screen. The content of the image edit screen has been described above with respect to Step S631, and thus will it not be described. The image edit screen displays the thumbnail image of a JPEG data having a file name including the next number of the serial numbers added in Step S630 to the shared data designated in the API of the OS 14a in Step S638, as a process target thumbnail image 201. Thereafter, in Step S662, the CPU 11 determines whether image edit has been selected. The content of the process of Step S662 is the same as the content of the process of Step S632 described above, and thus will it not be described. Also, the content of the process of Step S664 is the same as the content of the process of Step S633 described above, and thus will it not be described.

In Step S668, the CPU 11 reads the sharing destination application identification information from the flash memory 14. In this way, the CPU 11 can recognize the sharing destination application 64.

In Step S670, the CPU 11 determines whether the sharing process instruction has been input. In a case where any sharing process instruction has not been input ("NO" in Step S670), the CPU 11 returns to Step S650. Meanwhile, in a case where a sharing process instruction has been input ("YES" in Step S670), the CPU 11 proceeds to Step S674.

In Step S674, the CPU 11 controls the LCD 18 to display the list of the names 82 of single-data handling applications in the sharing destination application list screen 81. Also, the content of the process of Step S674 is the same as the content of the process of Step S620 described above, and thus will it not be described.

In Step S678, the CPU 11 determines whether any sharing destination application 64 has been selected. Also, the content of the process of Step S678 is the same as the content of the process of Step S622 described above, and thus will it not be described. In a case where it is determined that any sharing destination application 64 has not been selected ("NO" in Step S678), the CPU 11 returns to Step S678. Meanwhile, in a case where it is determined that a sharing destination application 64 has been selected ("YES" in Step S678), the CPU 11 returns to Step S638.

Meanwhile, in a case where it is determined in Step S650 that the sharing process has been completed for all of the plurality of selected JPEG data ("YES" in Step S650), the CPU 11 proceeds to Step S652. In Step S652, the CPU 11 controls the LCD 18 to display information representing that the process for sharing all of the selected JPEG data with the sharing destination application 64 has been completed. At this time, the CPU 11 may control the LCD 18 to display a process target thumbnail image 201 finally shared with the sharing destination application 64. In Step S654, the CPU 11 deletes the flag representing that the sharing process is being performed, the sharing destination application identification information, and the unprocessed information, from the flash memory 14. Then, the CPU 11 finishes the flow.

Figure 9:
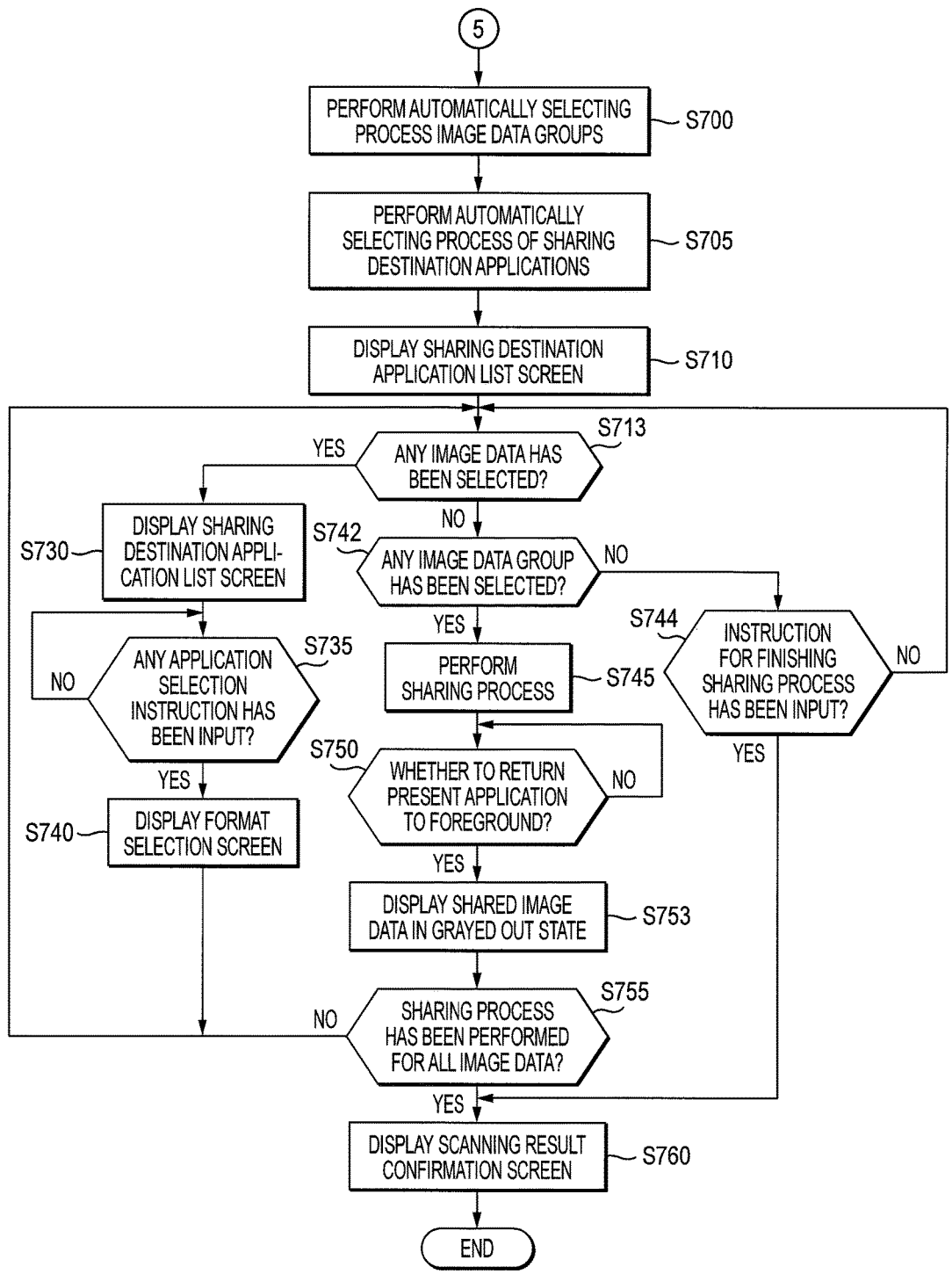
FIG. 9 is another flow chart illustrating the sharing process.

Also, in Step S614 of FIG. 6, if an instruction for performing the individual selecting process has been input ("INDIVIDUAL SELECTING" in Step S614), the CPU 11 proceeds to Step S700 of FIG. 9. In Step S700, the CPU 11 performs a automatically selecting process image data groups. The automatically selecting process image data groups is a process of selecting first to N-th (wherein N is a natural number of 2 or more) image data groups from the image data set acquired in Step S404. Each image data group includes at least one of the plurality of image data included in the image data set. The image data group selection is performed based on the characteristics of the image data. In the present embodiment, as an example, a case where the image data group selection is performed based on the image size characteristics of the image data will be described. Specifically, a case where image data having sizes equal to or larger than the A4 size which is a predetermined image size are selected as a first image data group, and image data having sizes smaller than the predetermined image size are selected as a second image data group will be described. That is, a case where two image data groups are selected from the image data set will be described.

In Step S705, the CPU 11 performs a automatically selecting process of the sharing destination applications 64. The automatically selecting process of the sharing destination application 64 is a process of selecting of the sharing destination applications 64 corresponding to the first to N-th image data groups, respectively. The selection of the sharing destination applications 64 is performed based on the characteristics of the image data. In the present embodiment, as an example, a case where the selection of the sharing destination applications 64 is performed based on the image size as characteristics of the image data will be described. Specifically, with respect to the first image data group having sizes equal to or larger than the A4 size, an application handling text information (for example, a PDF handling application) is selected as a sharing destination application 64. Also, with respect to the second image data group having sizes smaller than the A4 size, an application handling image information (for example, a JPEG handling application) is selected as a sharing destination application 64.

Figure 4B:
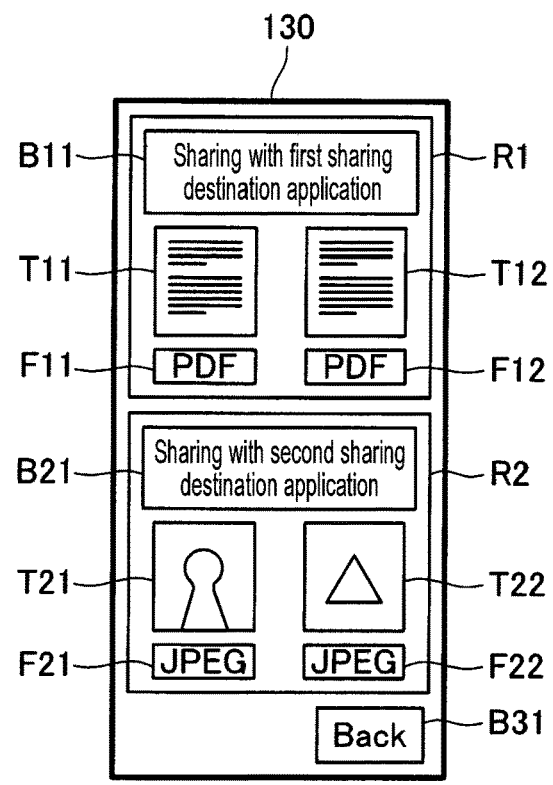
FIG. 4B is a view illustrating another screen example of the sharing destination application list screen.

In Step S710, the CPU 11 controls the LCD 18 to display a sharing destination application list screen 130. FIG. 4B shows a screen example of the sharing destination application list screen 130. The sharing destination application list screen 130 includes areas R1 and R2, and a Back button B31.

The area R1 is an area relative to the first image data group. The area R1 includes a sharing performing button B11, thumbnail images T11 and T12, and format display sections F11 and F12. The thumbnail images T11 and T12 are reduced images for identifying image data included in the first image data group. The format display sections F11 and F12 are areas for displaying formats to be used for sharing the image data represented by the thumbnail images T11 and T22, respectively. The sharing performing button B11 is a button for receiving an instruction for performing a process for sharing the image data, represented by the thumbnail images T11 and T22, with a first sharing destination application. The first sharing destination application is the sharing destination application 64 selected with respect to the first image data group. On the sharing performing button B11, the name of the first sharing destination application may be displayed.

The area R2 is an area relative to the second image data group. The area R2 includes a sharing performing button B21, thumbnail images T21 and T22, and format display sections F21 and F22. The display content of the area R2 is the same as the display content of the area R1 described above, and are not described here.

The Back button B31 is a button for receiving input of an instruction for finishing the display of the sharing destination application list screen 130 and displaying the previous screen of the sharing destination application list screen 130.

Steps S713 to S740 are Steps for re-selecting of the sharing destination applications 64 and formats for sharing, for each data, instead of the sharing destination applications 64 and the formats for sharing automatically selected in Steps S700 and S705. In Step S713, the CPU 11 determines whether any image data has been selected. This determination may be performed based on whether any one of the thumbnail images displayed in the sharing destination application list screen 130 has been touched. In a case where it is determined that any image data has been selected ("YES" in Step S713), the CPU 11 proceeds to Step S730. In Step S730, the CPU 11 controls the LCD 18 to display a sharing destination application list screen. The content of the sharing destination application list screen has been described for Step S426 and FIG. 3E, and thus it is not described here. In Step S735, the CPU 11 determines whether any application selection instruction has been input. In a case where it is determined that any application selection instruction has not been input ("NO" in Step S735), the CPU 11 returns to Step S735. Meanwhile, in a case where it is determined that an application selection instruction has been input ("YES" in Step S735), the CPU 11 proceeds to Step S740. In Step S740, the CPU 11 controls the LCD 18 to display a format selection screen. The content of the format selection screen has been described for Step S414 and FIG. 3B, and thus it is not described here. If a format in sharing is selected, the CPU 11 returns to Step S713. Thereafter, the CPU 11 controls the LCD 18 to display a sharing destination application list screen 130 to which the change in sharing destination application 64 and the change in format in sharing have been reflected.

Meanwhile, in a case where it is determined in Step S713 that any image data has not been selected ("NO" in Step S713), the CPU 11 proceeds to Step S742. In Step S742, the CPU 11 determines whether a sharing process instruction has been input with respect to any image data group. This determination may be performed based on whether the sharing performing button B11 or B21 has been touched. In a case where it is determined that a sharing process instruction has not been input with respect to any image data group ("NO" in Step S742), the CPU 11 proceeds to Step S744. In Step S744, the CPU 11 determines whether an instruction for finishing the sharing process has been input. This determination may be performed based on whether the Back button B31 has been touched. In a case where it is determined that an instruction for finishing the sharing process has not been input ("NO" in Step S744), the CPU 11 returns to Step S713. Meanwhile, in a case where it is determined that an instruction for finishing the sharing process has been input ("YES" in Step S744), the CPU 11 proceeds to Step S760.

Meanwhile, in a case where it is determined that the sharing process instruction has been input with respect to any image data group ("YES" in Step S742), the CPU 11 proceeds to Step S745. In Step S745, the CPU 11 performs a sharing process for sharing image data included in the selected image data group, with the sharing destination application 64. Specifically, the CPU 11 calls the API of the OS 14a, and designates the identification information of the sharing destination application 64, the URI, the type "JPEG" or "PDF", and the action "SEND_MULTI" or an action "SEND" of each of one or more shared data which are image data, and requests the OS 14a to perform an explicit sharing function. Then, the OS 14a requested to perform the sharing function displays the screen of the sharing destination application 64 in the foreground while displaying the screen of the present application 14b which is the sharing source application 60, in the background of the screen of the sharing destination application 64. Then, the present application 14b becomes a standby state.

In Step S750, the CPU 11 determines whether to return the present application 14b which is the sharing source application 60 to the foreground. The specific process content has been described with respect to Step S644, and thus it is not described here. In a case where it is determined to return the present application 14b to the foreground ("NO" in Step S750), the CPU 11 returns to Step S750. Meanwhile, in a case where it is determined to return the present application 14b to the foreground ("YES" in Step S750), the CPU 11 determines that sharing has been completed, and proceeds to Step S753. In Step S753, the CPU 11 controls the LCD 18 to display the thumbnail images of the image data shared in the current sharing process, in a grayed out state.

In Step S755, the CPU 11 determines whether the sharing process has been performed for all image data included in the image data set. In a case where it is determined that the sharing process has not been performed for all image data ("NO" in Step S755), the CPU 11 returns to Step S713. Meanwhile, in a case where it is determined that the sharing process has been performed for all image data ("YES" in Step S755), the CPU 11 proceeds to Step S760. In Step S760, the CPU 11 controls the LCD 18 such that the LCD 18 finishes the display of the sharing destination application list screen 130, and displays the scanning result confirmation screen 70 (see FIG. 3A). Then, the CPU 11 finishes the flow.

Effect of First Embodiment

A plurality of image data may include image data whose sharing destination applications 64 are different from each other. For example, a case of scanning documents of a plurality of pages including text pages and photograph pages and sharing the text pages and the photograph pages respectively with different sharing destination applications 64 can be exemplified. In this case, in a case of scanning the documents one page by one page, and repeating an operation for selecting a sharing destination application 64 every when scanning is completed, the operation is troublesome, and thus the convenience for users is reduced.

According to the device control application 14b disclosed in this disclosure, it is possible to select each of first to N-th image data groups (N image data) from a plurality of image data included in an image data set generated by one scanning instruction (Step S700). Also, it is possible to select different sharing destination applications 64 for each of the N image data groups (Step S705). Further, it is possible to share the first to N-th image data groups with the selected sharing destination applications 64, respectively. Therefore, even in a case of handling a plurality of image data as one image data set, it is possible to select different sharing destination applications 64 respectively for the plurality of image data included in the image data set. Therefore, for example, even in a case of setting documents of a plurality of pages including text pages and photograph pages on the ADF of the device 30, and inputting one scanning instruction, thereby generating one image data set, it is possible to share the text pages and the photograph pages included in the corresponding one image data set, respectively with different sharing destination applications 64. Therefore, it is unnecessary to repeat an operation of setting documents one sheet by one sheet, and inputting scanning instructions one by one, and selecting a sharing destination application 64 whenever a document data is generated. Since it is possible to simplify the user's operation, it is possible to improve the convenience for users.

According to the device control application 14b disclosed in this disclosure, it is possible to automatically select first to N-th image data groups and sharing destination applications 64 based on the characteristics of image data (Steps S700 and S705). As the characteristics of image data, image sizes (such as an A4 size and an L size) can be exemplified. Therefore, it is possible to reduce the user's operation burden for selecting image data groups and sharing destination applications 64, and thus it is possible to improve the convenience.

Second Embodiment

Figure 10:
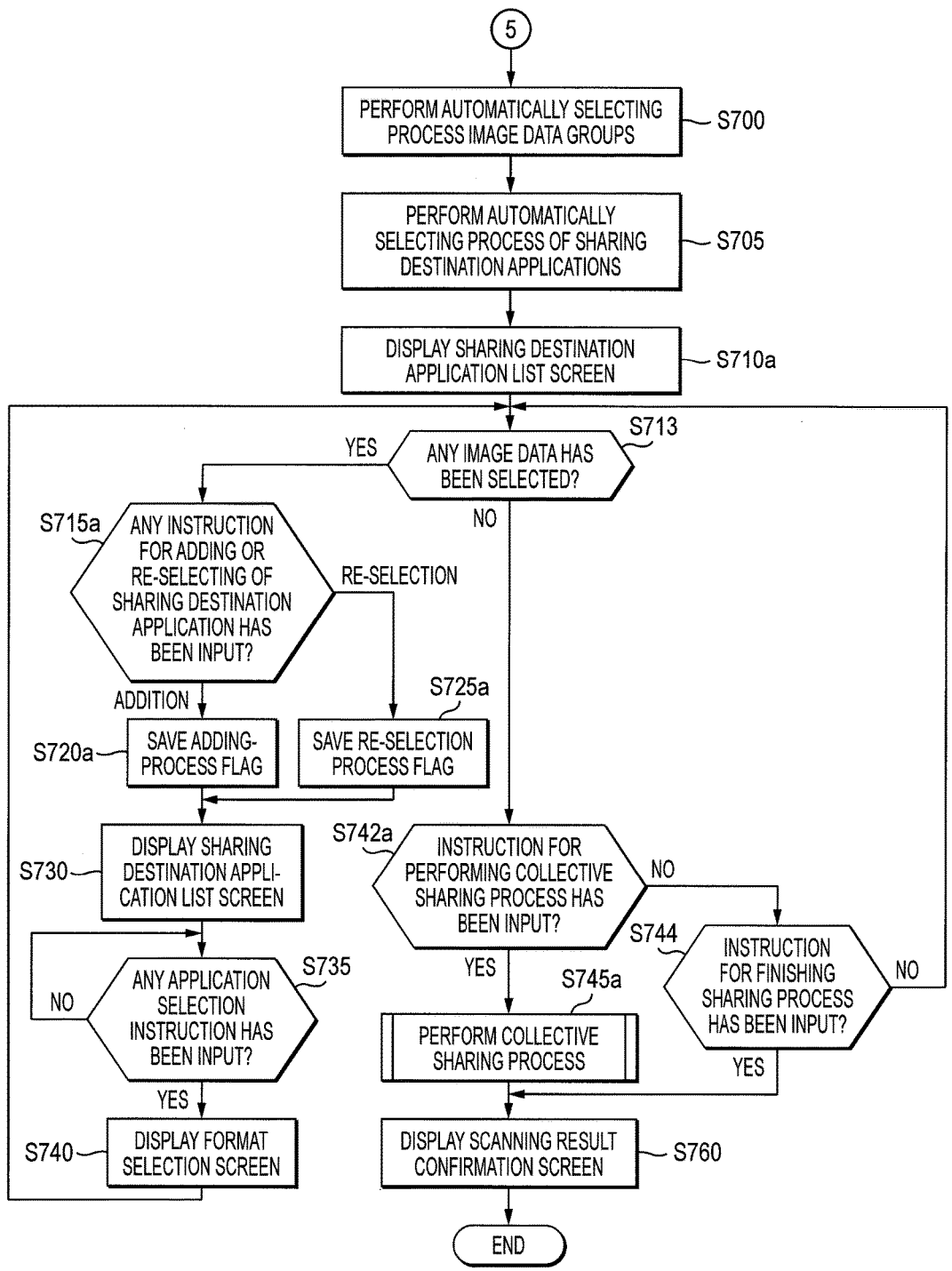
FIG. 10 is a flow chart illustrating a modification of the sharing process.

A second embodiment is a modification of the process (see FIG. 9) in the case where an instruction for performing the individual selecting process has been input. According to the second embodiment, if one sharing instruction input is received, whereby processes for sharing with a plurality of sharing destination applications 64 are collectively performed. In the flow of FIG. 10, the contents of Steps denoted by the same reference symbols as those of the flow of FIG. 9 have been described, and thus they are not described here.

Figure 4C:
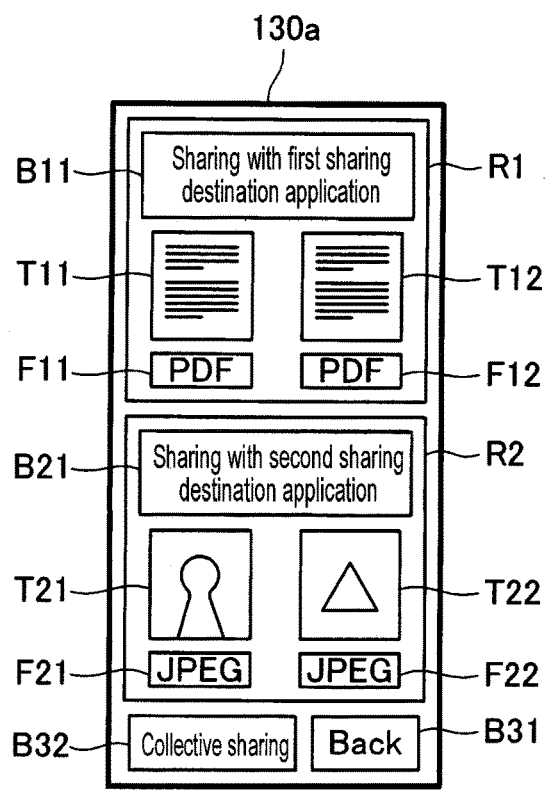
FIG. 4C is a view illustrating a further screen example of the sharing destination application list screen.

In Step S710a, the CPU 11 controls the LCD 18 to display a sharing destination application list screen 130a. FIG. 4C shows a screen example of the sharing destination application list screen 130a. The sharing destination application list screen 130a is a screen obtained by adding a collective sharing performing button B32 to the sharing destination application list screen 130 shown in FIG. 4B.

In Step S713, the CPU 11 determines whether any image data has been selected as a selected image data. In a case where it is determined that any image data has been selected as a selected image data ("YES" in Step S713), the CPU 11 controls the LCD 18 to display an addition button (not shown) for adding sharing destination applications 64 (not shown), and a re-selection button (not shown) for re-selecting of the sharing destination applications 64. The addition button is a button for receiving an instruction input for adding new sharing destination applications 64 to the selected sharing destination application 64 for the selected image data. The re-selection button is a button for receiving an instruction input for re-selecting a sharing destination application 64, instead of the selected sharing destination application 64 for the selected image data. Then, the CPU 11 proceeds to Step S715a.

In Step S715a, the CPU 11 determines whether any instruction for adding or re-selecting a sharing destination application 64 has been input. This determination may be performed based on whether the addition button or the re-selection button described above has been touched. In a case where an addition instruction has been input ("ADDITION" in Step S715a), the CPU 11 proceeds to Step S720a in which the CPU 11 stores an adding process flag in the flash memory 14. Meanwhile, in a case where a re-selection instruction has been input ("RE-SELECTION" in Step S715a), the CPU 11 proceeds to Step S725a in which the CPU 11 stores a re-selection process flag in the flash memory 14. Thereafter, if a format in sharing is selected in Step S740, the CPU 11 returns to Step S713. Then, in a case where the adding process flag has been saved in the flash memory 14, the CPU 11 controls the LCD 18 to display a sharing destination application list screen 130 including a sharing destination application 64 added for the selected image data. Also, in a case where the re-selection process flag has been saved in the flash memory 14, the CPU 11 controls the LCD 18 to display a sharing destination application list screen 130 to which the change in sharing destination application 64 relative to the selected image data has been reflected.

Meanwhile, in a case where it is determined that any image data has not been selected as a selected image data ("NO" in Step S713), the CPU 11 proceeds to Step S742a. In Step S742a, the CPU 11 determines whether an instruction for performing a collective sharing process has been input. This determination may be performed based on whether the collective sharing performing button B32 has been touched. In a case where it is determined that an instruction for performing a collective sharing process has been input ("YES" in Step S742a), the CPU 11 proceeds to Step S745a in which the CPU 11 performs the collective sharing process.

Figure 11:
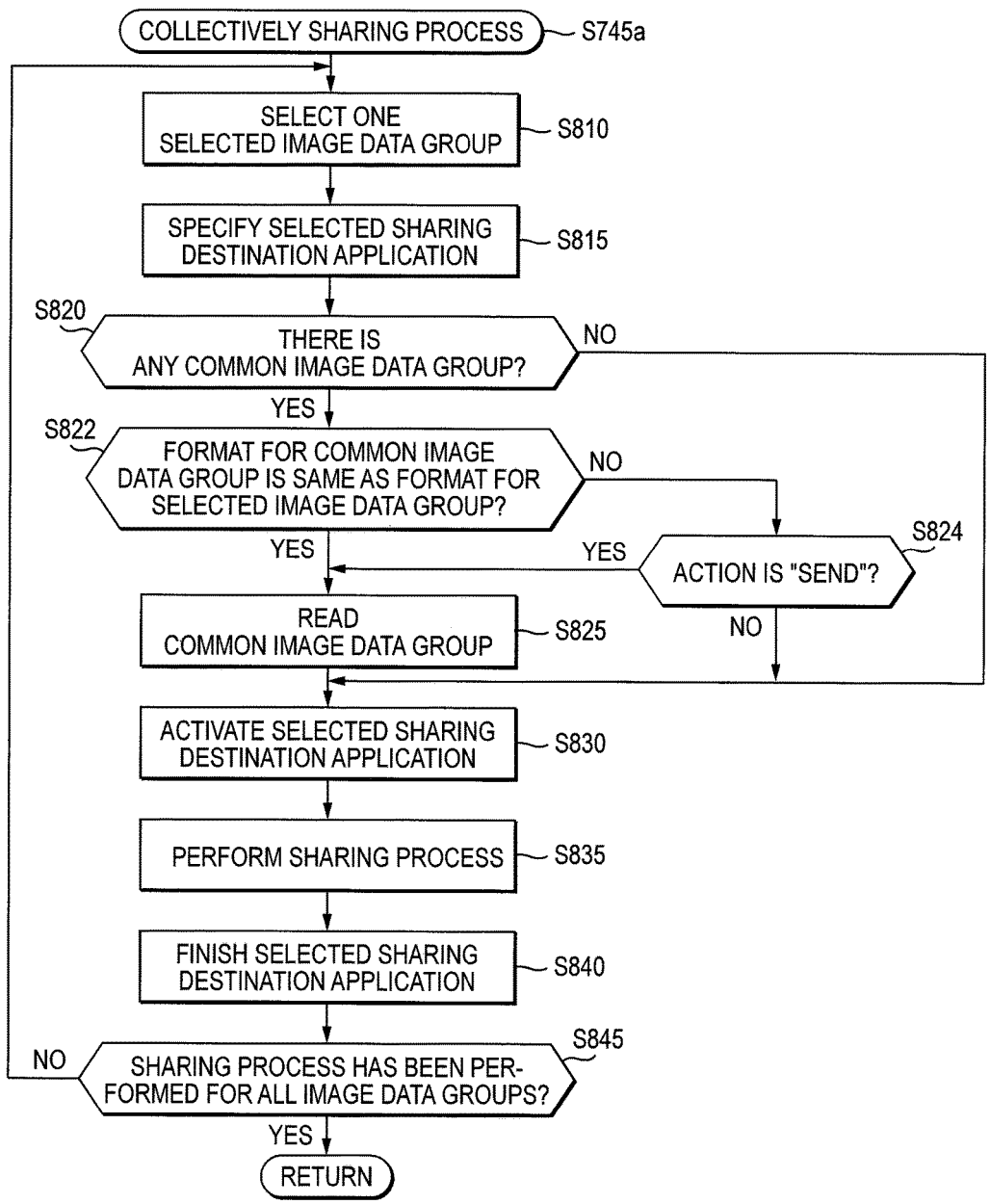
FIG. 11 is a flow chart illustrating a collective sharing process.

With reference to FIG. 11, the collective sharing process performed in Step S745a will be described. In Step S810, the CPU 11 selects one selected image data group from a plurality of unshared image data groups. In Step S815, the CPU 11 specifies a sharing destination application 64 selected for the selected image data group.

In Step S820, the CPU 11 determines whether any unshared image data group (hereinafter, referred to as common image data group) associated with a common sharing destination application, which is the same as the selected a sharing destination application 64, exists in the first to N-th image data groups. In a case where it is determined that any unshared image data group associated with a common sharing destination application is not exist ("NO" in Step S820), the CPU 11 proceeds to Step S830. Meanwhile, in a case where it is determined that any unshared image data group associated with a common sharing destination application is exist ("YES" in Step S820), the CPU 11 proceeds to Step S822.

In Step S822, the CPU 11 determines whether the format in sharing of the common image data group is the same as the format in sharing of the selected image data group. In a case where it is determined the format in sharing of the common image data group is the same as the format in sharing of the selected image data group ("YES" in Step S822), the CPU 11 proceeds to Step S825. Meanwhile, in a case where it is determined the format in sharing of the common image data group is not the same as the format in sharing of the selected image data group ("NO" in Step S822), the CPU 11 proceeds to Step S824.

In Step S824, the CPU 11 determines whether the content of the action for the common image data group is a first content, where the common image data group is to be output without changing the information content of the common image data group. For example, in a case where the action is "SEND", the CPU 11 may determine that the content of the action for the common image data group is the first content. Also, in a case where the action is "VIEW" or "EDIT", the CPU 11 may determine that the content of the action for the common image data group is not the first content. In a case where it is determined that the content of the action for the common image data group is not the first content ("NO" in Step S824), the CPU 11 skips Step S825 and proceeds to Step S830. Meanwhile, in a case where it is determined that the content of the action for the common image data group is the first content of Step S824 is positive ("YES" in Step S824), the CPU 11 proceeds to Step S825. In Step S825, the CPU 11 reads the common image data group. In this way, in addition to the selected image data group, the common image data group can also be designated as a target of the sharing process.

In Step S830, the CPU 11 activates the selected sharing destination application. In Step S835, the CPU 11 performs the sharing process. In this way, it is possible to perform the sharing process for all of the selected image data group and the common image data group by activating the selected sharing destination application once. In Step S840, the CPU 11 finishes the selected sharing destination application.

In Step S845, the CPU 11 determines whether the sharing process has been performed for all image data groups. In a case where it is determined that the sharing process has not been performed for all image data groups ("NO" in Step S845), the CPU 11 returns to Step S810. Meanwhile, in a case where it is determined that the sharing process has been performed for all image data groups ("YES" in Step S845), the CPU 11 finishes the sharing performing process.

Specific Operation Example

Figure 12:
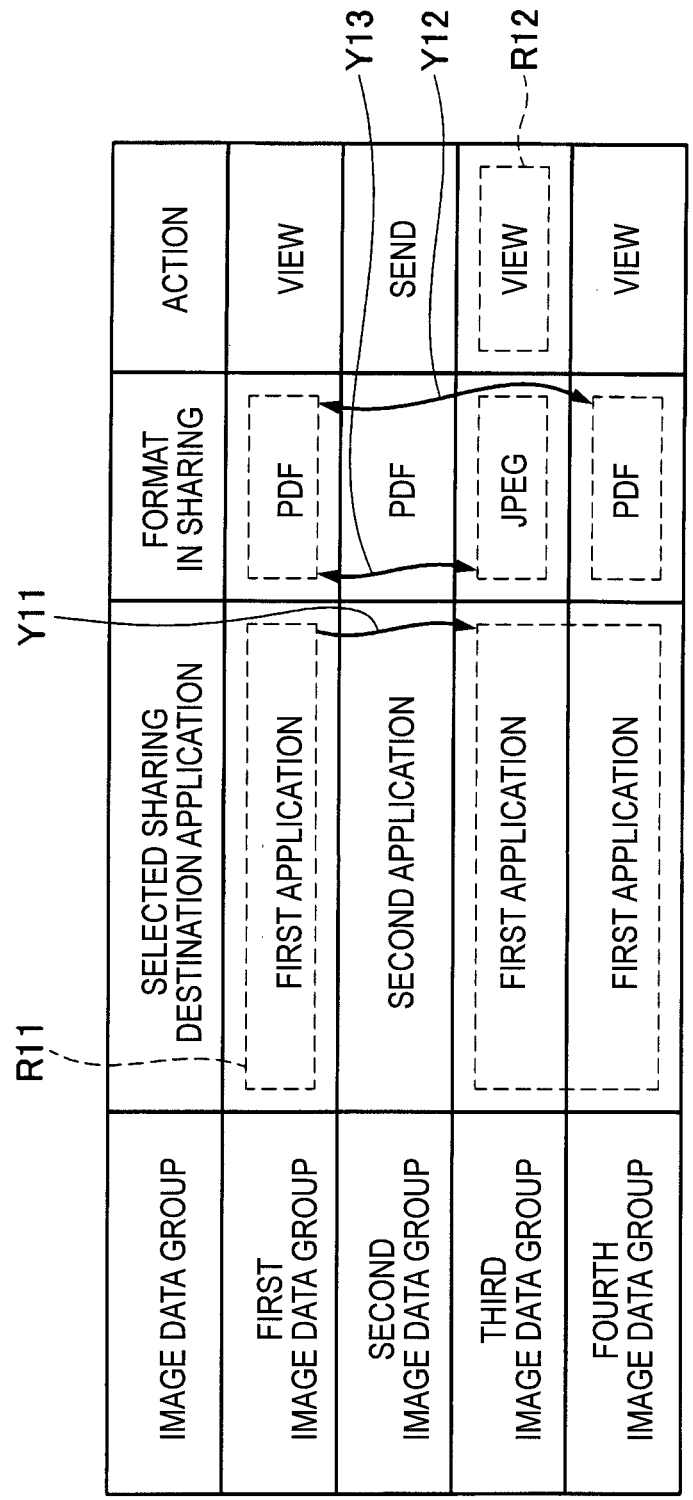
FIG. 12 is a table for explaining a specific operation example of the collective sharing process.

An specific operation example of the collective sharing process shown in FIG. 11 will be described. As an example, a case where there are first to fourth image data groups as shown in FIG. 12 will be described. The table of FIG. 12 is a table for explaining combination examples of sharing destination applications, formats for sharing, and actions selected with respect to the first to fourth image data groups.

In Step S810, the CPU 11 selects the first image data group. Next, in Step S815, the CPU 11 specifies that a sharing destination application selected for the first image data group is a first application (see an area R11). Then, the CPU 11 determines that the third image data group and the fourth image data group are also associated with the first application ("YES" in Step S820) (see an arrow Y11).

Since the format (that is, "PDF") for sharing the fourth image data group is the same as the format (that is "PDF") for sharing the first image data group ("YES" in Step S822), in Step S825, the CPU 11 adds the fourth image data group as a target of the sharing process (see an arrow Y12). Meanwhile, the format (that is "JPEG") for sharing the third image data group is different from the format (that is, "PDF") for sharing the first image data group ("NO" in Step S822) (see an arrow Y13). Further, the action for the third image data group is not "SEND" ("NO" in Step S824) (see an area R12). Therefore, the CPU 11 skips Step S825. As a result, the third image data group is not added as a target of the sharing process. Thereafter, the CPU 11 activates the first application in Step S830, and performs the sharing process for the first and fourth image data groups in Step S835. Then, in Step S840, the CPU 11 finishes the first application.

At this time, the sharing process has not been performed for all image data groups ("NO" in Step S845). As a result, in Step S810, as the next image data group, the second image data group is selected. Then, in Step S815, the CPU 11 specifies that a sharing destination application selected for the second image data group is a second application. In this case, the CPU 11 determines that any other image data group is not associated with the second application ("NO" in Step S820), and activates the second application in Step S830. Then, the CPU 11 performs the sharing process for the second image data group in Step S835, and finishes the second application in Step S840.

At this time, the sharing process has not been performed for all image data groups ("NO" in Step S845). As a result, in Step S810, as the next image data group, the third image data group is selected. Then, in Step S815, the CPU 11 specifies that the sharing destination application selected for the third image data group is the first application. In this case, the CPU 11 determines that the first application is not associated with any other unshared image data group ("NO" in Step S820), and activates the first application in Step S830. Thereafter, the CPU 11 performs the sharing process for the first image data group in Step S835, and finishes the first application in Step S840. Then, since performance of the sharing process has been completed for all image data groups ("YES" in Step S845), the CPU 11 finishes the flow.

Effect of Second Embodiment

According to the device control application 14b disclosed in this disclosure, if one instruction for performing a collective sharing process is received ("YES" in Step S742a), in Step S745a, it is possible to perform a plurality of sharing processes for each of the first to N-th image data groups. Therefore, as compared to a case of receiving a plurality of sharing process instructions for each of a plurality of image data, it is possible to reduce the receiving frequency of the sharing process instruction, and thus it is possible to improve the convenience for users.

According to the device control application 14b disclosed in this disclosure, it is possible to sequentially activate a plurality of sharing destination applications one by one (Step S830), and then to make one activated sharing destination application perform a sharing process (Step S835). Further, in a case where any common image data group associated with a common sharing destination application exists in the first to N-th image data groups ("YES" in Step S820), in Step S835, it is possible to perform a sharing process for all common image data groups by single activating of the common sharing destination application. In this way, if a common sharing destination application is activated, it is possible to perform a collective sharing process for all common image data groups associated with the common sharing destination application. Therefore, it is possible to suppress a common sharing destination application from being activated multiple times, and thus it is possible to reduce time for the sharing process.

According to the device control application 14b disclosed in this disclosure, in the case where common image data groups associated with a common sharing destination application exist in the first to N-th image data groups ("YES" in Step S820), if the formats associated with the common image data groups are different from each other ("NO" in Step S822 and "NO" in Step S824), in Step S830, it is possible to activate the common sharing destination application for each of the common image data groups associated with the different formats. Therefore, if the common sharing destination application is activated, it is possible to collectively perform a sharing process for all common image data groups same in the information format, of the common image data groups associated with the common sharing destination application 64. Therefore, it is possible to reduce time for the sharing process, and thus it is possible to improve the convenience.

According to the device control application 14b disclosed in this disclosure, in the case where common image data groups associated with a common sharing destination application exist in the first to N-th image data groups ("YES" in Step S820), if the formats associated with the common image data groups are different from each other ("NO" in Step S822) and the content of the sharing process is the first processing in which the common image data groups is to be output without changing the information contents of the common image data groups ("YES" in Step S824), in Step S835, it is possible to perform the sharing process for all common image data groups by single activating of the common sharing destination application. Therefore, when a common sharing destination application 64 is activated, common image data groups to be subjected to a sharing process in which the common image data groups is to be output without changing the information contents of the common image data groups, of the common image data groups associated with the common sharing destination application 64, it is possible to collectively perform the sharing process.

Although this disclosure has been described based on the embodiments, this disclosure is not limited to the above-mentioned embodiments, and it can be easily inferred that this disclosure may be modified in various forms without departing from the scope of the invention.

<First Modification>

An image data set may be a set of various image data. For example, in a case of downloading various data saved in the server device 52 through the wireless LAN transceiver unit 15, a set of a plurality of image data acquired by a downloading process may be defined as an image data set. Also, in a case of downloading a compressed folder, a set of a plurality of image data included in the compressed folder may be defined as an image data set. Therefore, it is possible to share a plurality of image data included in an image data set acquired from the server device 52, respectively with different sharing destination applications 64.

<Second Modification>

Figure 13:
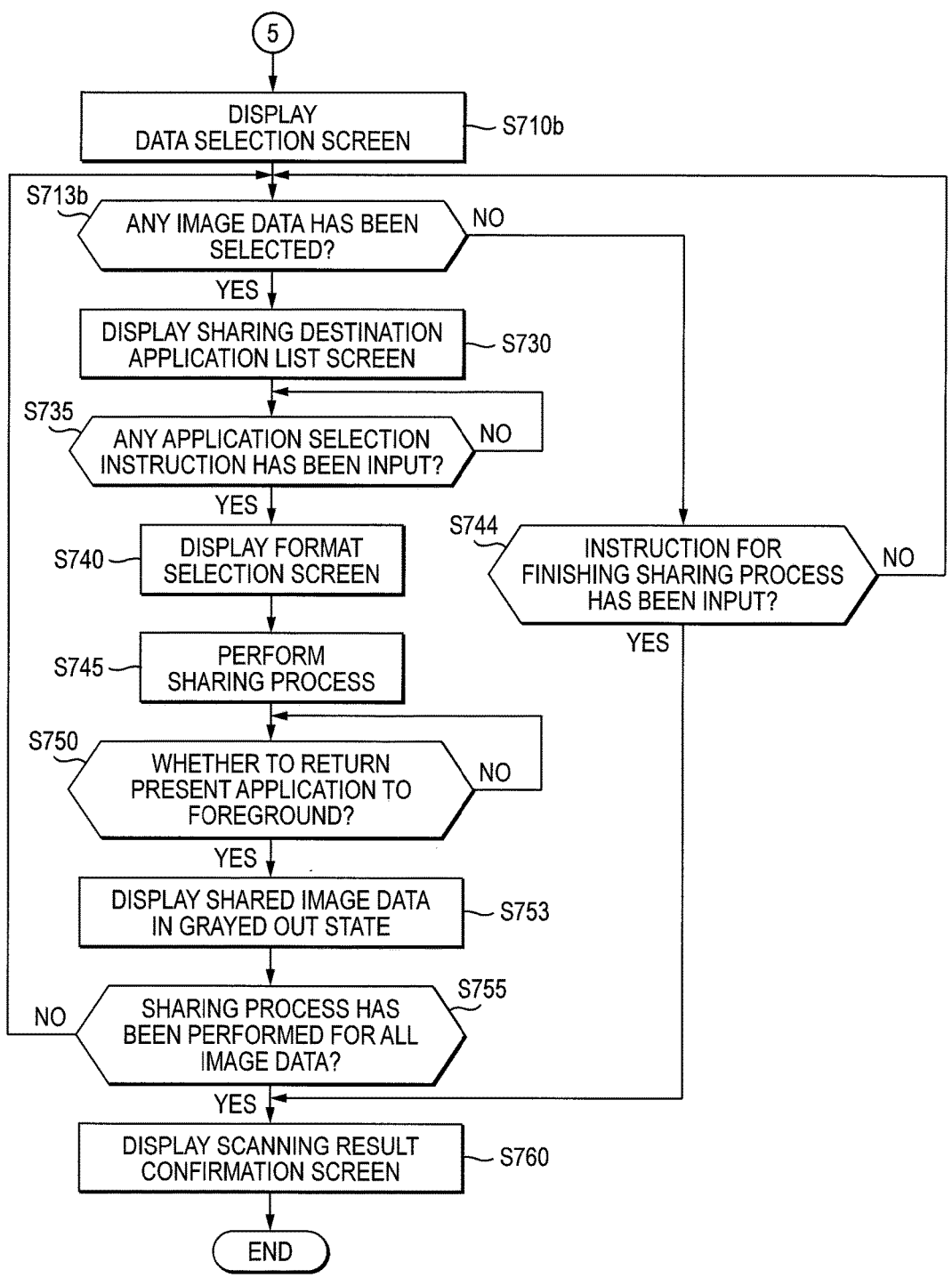
FIG. 13 is a flow chart illustrating another modification of the sharing process.

The process of Step S700 for automatically selecting image data groups, and the process of Step S705 for automatically selecting of the sharing destination applications 64 can be omitted. In this case, the user may select image data groups and sharing destination applications 64 by a manual selection process. FIG. 13 shows the flow of the manual selection process. In the flow of FIG. 13, the contents of Steps denoted by the same reference symbols as those of the flow of FIG. 6 have been described, and thus they are not described here.

In Step S710b, the CPU 11 controls the LCD 18 to display a data selection screen. In the data selection screen, the list of thumbnail images relative to all image data designated as shared data in Step S600 is displayed. Also, check boxes for selecting the image data are displayed in association with the thumbnail images, respectively. In Step S713b, the CPU 11 determines whether any image data has been selected. This determination may be performed based on whether at least one check box displayed in the data selection screen has been selected.

Therefore, it is possible to share image data selected in Step S713b, with sharing destination applications 64 selected in Step S735. Also, since image data having been subjected to the sharing process are displayed in a grayed out state in Step S753, it is possible to prevent the corresponding image data from being selected in the subsequent loops.

<Other Modifications>

The case of selecting two image data groups in Step S700 has been exemplified. However, this disclosure is not limited thereto. Three or more image data groups can be selected. For example, it can select four image data groups having such as sizes equal to or larger than the A4 size, sizes smaller than the A4 size and equal to or larger than the B5 size, sizes smaller than the B5 size and equal to or larger than the L size, and sizes smaller than the L size.

The characteristics of image data which are used to select image data groups in Step S700 are not limited to image size characteristics, and various other characteristics can be used. For example, when generating image data, the device 30 may acquire image kinds (such as text images and photographic images) as the characteristics of the image data by a technique such as OCR (Optical Character Recognition). In this case, in Step S700, image data having text image characteristics may be selected as a first image data group, and image data having photographic image characteristics may be selected as a second image data group.

The process of re-selecting of the sharing destination applications 64 and formats for sharing, instead of the sharing destination applications 64 and the formats for sharing automatically selected, can be omitted. In this case, in the flow of FIG. 9, Steps S713 to S740 need to be omitted. After Step S710, the CPU 11 is to proceed to Step S742.

The process of displaying the scanning result confirmation screen 70 can be omitted. In this case, Step S760 in the flow of FIG. 9 is to be omitted.

More generally, an information processing program will cause a processor to function at least as an image information set acquiring unit, an image information group selecting unit, an output destination application selecting unit, and a process control unit or to perform operations corresponding to above described unit.

In the above described embodiments, an example of the format unsupporting multi-page is the JPEG format, and an example of the format supporting multi-page is the PDF format. However, this disclosure is not limited thereto. For example, a variety of formats such as PNG, GIF, and BMP can become examples of the format unsupporting multi-page. Also, a variety of formats such as DOC and XLS can become examples of the format supporting multi-page.

In the above described embodiments, the mobile terminal 10 having a telephone function is an example of an information processing device. However, a variety of other devices having no telephone functions, such as personal computers and digital cameras can become examples of the information processing device. Also, this disclosure can also be applied to devices having no touch panels and having hard keys for inputting operations.

Also, in the above described embodiments, JPEG data and PDF data are saved in the memory card 20 detachably attached to the mobile terminal 10. However, for example, JPEG data and PDF data may be saved in the flash memory 14 built in the mobile terminal 10.

Also, in the above described embodiments, scanner data have been described as examples of image data. However, the image data are not limited thereto, and may be image data acquired by a digital camera built in the mobile terminal 10. The digital camera may use a continuous photographing function to generate a plurality of image data by one photographing operation. Also, data generated by performing a reducing or enlarging process on scan data according to the sizes of scanned images 71 to be displayed on the LCD 18 may be examples of the image data.

Also, in the above described embodiments, the term "generation" means conversion of an image data acquired from the device 30 into a file of a selected format. In this case, the URI of a shared data is composed of a file path. However, the term "generation" may mean conversion of an image data acquired from the device 30 into content of a process target format. In this case, the URI of a shared data is configured in a content form which specifies the data by an ID or intent in an application, like "Contents:///device-control1/attach/1".

Also, in the above described embodiments, the OS 14a is an Android OS. However, this disclosure can also be applied to information processing devices having other OSs.

Also, in the above described embodiments, the sharing functions are implemented by the OS 14a. However, for example, this disclosure can also be applied to a case where the sharing functions are implemented by hardware or software.

Also, in the above described embodiments, the mobile terminal 10 and the device 30 are connected by Wi-Fi. However, for example, this disclosure can also be applied to a case where the mobile terminal 10 and the device 30 are connected by Bluetooth (registered as a trade mark).

Also in the above described embodiments, the names 82 of applications which are included in the sharing destination application list screen 81 (FIG. 3E) are used as images for identifying the applications. However, as images for identifying applications, the icon images of the applications may be used.

Also in the above described embodiments, the present application 14b generates data in two formats. However, this disclosure can also be applied to a program for generating data in three or more formats.

Each of the image information set acquiring unit, the image information group selecting unit, the output destination application selecting unit, and the process control unit may be a single piece of hardware, or hardware which operates by executing the program of this disclosure, or a program such as an operating system other than this disclosure. Also, each of those means may be hardware which operates by combining processes according to a plurality of programs.

Each sharing source application 60 is an example of a data output source application. Each sharing destination application 64 is an example of an output destination application. The CPU 11 is an example of a data sharing unit. The mobile terminal 10 is an example of an information processing device. The device control application 14b is an example of an information processing program. The device 30 and the server device 52 are examples of an external device. The wireless LAN transceiver unit 15 is an example of a communication interface. The CPU 11 is an example of a processor. The CPU 11 which performs Step S404 is an example of the image information set acquiring unit. The CPU 11 which performs Step S700 is an example of the image information group selecting unit. The CPU 11 which performs Step S705 is an example of the output destination application selecting unit. The CPU 11 which performs Step S745 is an example of the process control unit. JPEG and PDF are examples of information formats. Image sizes and image kinds are examples of the characteristics of image information. Each PDF handling application is an example of an application handling text information. Each JPEG handling application is an example of an application handling image information.

According to the configuration disclosed in this disclosure, it is possible to share the first to N-th image information groups included in the image information set, respectively with different output destination applications. Therefore, it is unnecessary to repeat an operation for performing the sharing process for every image information. Therefore, it is possible to improve the convenience.

According to the configuration disclosed in this disclosure, if one sharing process instruction is received, it is possible to perform the sharing process for each of the first to N-th image information groups. Therefore, as compared to a case of receiving sharing process instructions for each of a plurality of image information, it is possible to reduce receiving frequency of the sharing process instruction, and thus it is possible to improve the convenience.

According to the configuration disclosed in this disclosure, if a common output destination application is activated, it is possible to collectively perform the sharing process for all common image information groups associated with the common output destination application. Therefore, it is possible to prevent a common output destination application from being activated multiple times, so that it is possible to reduce time for the sharing process and it is possible to improve the convenience.

According to the configuration disclosed in this disclosure, if a common output destination application is activated, it is possible to collectively perform the sharing process for all common image information groups same in the information format, of common image information groups associated with the common output destination application. Therefore, it is possible to reduce time for the sharing process, and thus it is possible to improve the convenience.

According to the configuration disclosed in this disclosure, if a common output destination application is activated, all common image information groups to be subjected to a sharing process in which the common image data groups is to be output without changing the information contents of the common image data groups, of common image information groups associated with the common output destination application, so that it is possible to collectively perform the sharing process. Therefore, it is possible to reduce time for the sharing process, and thus it is possible to improve the convenience.

According to the configuration disclosed in this disclosure, based on the characteristics of the image information, it is possible to automatically select the first to N-th image information groups and output destination applications. Therefore, it is possible to reduce the user's operation burden, and thus it is possible to improve the convenience.

According to the configuration disclosed in this disclosure, it is possible to automatically select image information groups and output destination applications in response to the sizes of documents scanned. Therefore, it is possible to reduce the user's operation burden, and thus it is possible to improve the convenience.

According to the configuration disclosed in this disclosure, it is possible to share first to N-th image information groups included in an image information set generated by a scanning process, respectively with different output destination applications. Therefore, it is possible to improve the convenience.

According to the configuration disclosed in this disclosure, it is possible to share first to N-th image information groups included in an image information set acquired from a server device, respectively with different output destination applications. Therefore, it is possible to improve the convenience.

Also, the technology disclosed in this disclosure can be implemented in various forms such as an information processing program, a control device for controlling the information processing device, an information processing system, an information processing method, and a recording medium having the information processing program recorded thereon.

What is claimed is:

1. A non-transitory computer readable medium storing instructions, which is read in an information processing device capable of performing of a sharing process causing an application, selected as a output destination from a plurality of applications, to process data output from a output source, wherein the information processing device includes:
a input interface;
a display;

a processor that, when executing the instructions, performs operations comprising:

acquiring an image data set including a plurality of image data;

defining plural image data groups, each of the plural image data groups including at least one of the image data included in the image data set, the plural image data groups including at least a first image data group and a second image data group;

searching, in a case where the image data group includes one image datum, the plurality of the applications including a first application, a second application, a third application that are installed in the information processing device for at least one application that is capable of processing the one image datum and is incapable of processing of plural image data;

searching, in a case where the image data group includes the plural image data, the plurality of the applications installed in the information processing device for at least one application capable of processing the plural image data;

displaying, on the display, the at least one application, for which the plurality of the applications installed in the information processing device are searched;

identifying, according to a first input from the input interface, the first application from the displayed applications for processing the first image data group, as the output destination;

identifying, according to a second input from the input interface, the second application from the displayed applications for processing the second image data group, as the output destination;

controlling: in response to a third input from the input interface, the third application as the output source to output at least one of image data included in the first image data group; and the information processing device to perform the sharing process of causing the first application, which is identified by the first input, to process the at least one of image data included in the first image data group; and controlling: in response to completion of the sharing processing of the image data by the first application, the third application as the output source to output at least one of image data included in the second image data group; and the information processing device to perform the sharing process of causing the second application, which is identified by the second input, to process the at least one of image data included in the second image data group.

2. The non-transitory computer readable medium according to claim 1, wherein the processor, when executing the instructions, further performs operations comprising:

receiving, in a case that the plural image data groups are defined and the plurality of applications are respectively selected with respect to the plural image data groups, an instruction input for performing the sharing process for each of the plural image data groups.

3. The non-transitory computer readable medium according to claim 1, wherein the processor, when executing the instructions, performs, in a case that common image data groups, each of which are associated with the same application being a common output destination application, exists in the plural image data groups, the sharing process for all of the common image data groups in a single activation of the common output destination application.

4. The non-transitory computer readable medium according to claim 3, wherein the processor, when executing the instructions, further performs operation of selecting data formats to be used in causing the selected applications to perform the sharing process, in association with each of the plural image data groups, wherein the sharing process for all of the common image data groups is performed in the single activation of the common output destination application in a case where each of formats associated with each of the plurality of image data groups included in the common image data groups respectively is same format.

5. The non-transitory computer readable medium according to claim 4, wherein the sharing process for all of the common image data groups is performed in a single activation of the common output destination application in a case that: the common image data groups exist in the plural image data groups; data formats associated with a plurality of image data groups included in the common image data groups are different; and the sharing process is a process to output the common image data groups without changing contents of the common image data groups.

6. The non-transitory computer readable medium according to claim 1, wherein the plurality of image data are associated with characteristics of the image data, respectively, wherein the processor, when executing the instructions, further performs operations comprising:

defining the plural image data groups based on the characteristics, and selecting the applications based on the characteristics.

7. The non-transitory computer readable medium according to claim 6, wherein the external device is an image processing device capable of performing a scanning process of scanning a plurality of documents and outputting the image data set, wherein the characteristics are sizes of the documents, wherein the processor, when executing the instructions, further performs operations comprising:

selecting image data associated with characteristics representing that image sizes are equal to or larger than a predetermined document size, as a first image data group;

selecting image data associated with characteristics representing that image sizes are smaller than the predetermined document size, as a second image data group;

selecting an application handling document data, as the data output destination for the first image data group; and selecting an application handling image data, as the data output destination for the second image data group.

8. The non-transitory computer readable medium according to claim 1, wherein the processor, when executing the instructions, performs the sharing process of causing the first application to process the at least one of the plurality of image data included in the first image data group in a sharing-result acquisition mode, the sharing-result acquisition mode is a mode in which in response to the completion of processing the image data by the first application, the completion notification is sent to a sharing source application.

9. The non-transitory computer readable medium according to claim 8,
wherein the completion notification is sent from the first application.

10. An information processing device comprising:
an application, selected as output destination from a plurality of applications, configured to process data output from a data output source as a result of a sharing process;
a input interface;
a display; and
a processor that, when executing the instructions, performs operations comprising:
acquiring an image data set including a plurality of image data;
defining plural image data groups, each of the plural image data groups including at least one of the image data included in the image data set, the plural image data groups including at least a first image data group and a second image data group;
searching, in a case where the image data group includes one image datum, the plurality of the applications installed in the information processing device for at least one application that is capable of processing the one image datum and is incapable of processing of plural image data,
searching, in a case where the image data group includes the plural image data, the plurality of the applications including a first application, a second application, a third application that are installed in the information processing device for at least one application capable of processing the plural image data,
displaying, on the display, the at least one application, for which the plurality of the applications installed in the information processing device are searched;
identifying, according to a first input from the input interface, the first application from the displayed applications for processing the first image data group, as the output destination;
identifying, according to a second input from the input interface, the second application from the displayed applications for processing the second image data group, as the output destination;
controlling: in response to a third input from the input interface, the third application as the output source to output at least one of image data included in the first image data group; and the information processing device to perform the sharing process of causing the first application, which is identified by the first input, to process at least one of image data included in the first image data group; and
controlling: in response to completion of the sharing processing of the image data by the first application, the third application as the output source to output at least one of image data included in the second image data group; and the information processing device to perform the sharing process of causing the second application, which is identified by the second input, to process at least one of image data included in the second image data group.

11. A method of controlling an information processing device including: an application selected as output destination from a plurality of applications, configured to process data output from a output source as a result of a sharing process, the method comprising:
acquiring an image data set including a plurality of image data;
defining plural image data groups, each of the plural image data groups including at least one of the image data included in the image data set, the plural image data groups including at least a first image data group and a second image data group;
searching, in a case where the image data group includes one image datum, the plurality of the applications including a first application, a second application, a third application that are installed in the information processing device for at least one application that is capable of processing the one image datum and is incapable of processing of plural image data,
searching, in a case where the image data group includes the plural image data, the plurality of the applications installed in the information processing device for at least one application capable of processing the plural image data,
displaying, on a display of the information processing device, the at least one application, for which the plurality of the applications installed in the information processing device are searched;
identifying, according to a first input from a input interface of the information processing device, the first application from the displayed applications for processing the first image data group, as the output destination;
identifying, according to a second input from the input interface, the second application from the displayed applications for processing the second image data group, as the output destination;
controlling: in response to a third input from the input interface, the third application as the output source to output at least one of image data included in the first image data group; and the information processing device to perform the sharing process of causing the first application, which is identified by the first input, to process the at least one of image data included in the first image data group; and
controlling: in response to completion of the sharing processing of the image data by the first application, the third application as the output source to output at least one of image data included in the second image data group; and the information processing device to perform the sharing process of causing the second application, which is identified by the second input, to process the at least one of image data included in the second image data group.

* * * * *